(12) United States Patent
Brander et al.

(10) Patent No.: US 7,863,350 B2
(45) Date of Patent: Jan. 4, 2011

(54) FOOD PRESERVATION COMPOSITIONS AND METHODS OF USE THEREOF

(75) Inventors: William M. Brander, Douglasville, GA (US); Thomas P. Gautreaux, Jonesboro, GA (US)

(73) Assignee: Maxwell Chase Technologies, LLC, Atlanta, GA (US)

( * ) Notice: Subject to any disclaimer, the term of this patent is extended or adjusted under 35 U.S.C. 154(b) by 314 days.

(21) Appl. No.: 11/939,129

(22) Filed: Nov. 13, 2007

(65) Prior Publication Data

US 2008/0175965 A1 Jul. 24, 2008

Related U.S. Application Data

(60) Provisional application No. 60/881,679, filed on Jan. 22, 2007.

(51) Int. Cl.
*A61L 9/04* (2006.01)
*A23L 3/34* (2006.01)
*C08K 3/18* (2006.01)
*C08K 3/34* (2006.01)

(52) U.S. Cl. ............... 523/122; 523/102; 523/200; 524/423; 524/445; 426/335; 426/532

(58) Field of Classification Search .............. 523/122, 523/102; 524/405, 423, 445; 426/335, 532
See application file for complete search history.

(56) References Cited

U.S. PATENT DOCUMENTS

| | | | |
|---|---|---|---|
| 3,996,386 A | 12/1976 | Malkki et al. | |
| 4,044,319 A | 8/1977 | Seinecke | |
| 4,382,507 A | 5/1983 | Miller | |
| 4,397,644 A | 8/1983 | Matthews et al. | |
| 4,410,578 A | 10/1983 | Miller | |
| 4,454,055 A | 6/1984 | Richman et al. | |
| 4,511,552 A | 4/1985 | Cox | |
| 4,708,870 A | 11/1987 | Pardini | |
| 4,762,722 A | 8/1988 | Izumimoto et al. | |
| 4,861,632 A | 8/1989 | Caggiano | |
| 4,865,855 A | 9/1989 | Hansen et al. | |
| 4,908,026 A | 3/1990 | Sukiennik et al. | |
| 4,929,480 A | 5/1990 | Midkiff et al. | |
| 4,943,440 A | 7/1990 | Armstrong | |
| 5,055,332 A | 10/1991 | Rhodes et al. | |
| 5,186,902 A | 2/1993 | Plester | |
| 5,429,628 A * | 7/1995 | Trinh et al. | 604/359 |
| 5,432,000 A * | 7/1995 | Young et al. | 428/372 |
| 5,451,369 A | 9/1995 | Daeschel et al. | |
| 5,489,399 A | 2/1996 | Koyakumaru et al. | |
| 5,505,950 A | 4/1996 | Floyd et al. | |
| 5,527,570 A | 6/1996 | Addeo et al. | |
| 5,540,979 A | 7/1996 | Yahiaoui et al. | |
| 5,573,797 A | 11/1996 | Wilhoit | |
| 5,573,801 A | 11/1996 | Wilhoit | |
| 5,639,466 A | 6/1997 | Ford et al. | |
| 5,650,446 A | 7/1997 | Wellinghoff et al. | |
| 5,705,213 A | 1/1998 | Guillin | |
| 5,709,897 A | 1/1998 | Pearlstein | |
| 5,721,187 A | 2/1998 | Ogawa et al. | |
| 5,820,955 A | 10/1998 | Brander | |
| 5,833,894 A | 11/1998 | Lanzani et al. | |
| 5,906,825 A | 5/1999 | Seabrook, Jr. et al. | |
| 5,908,649 A | 6/1999 | Floyd et al. | |
| 5,922,776 A | 7/1999 | Wellinghoff et al. | |
| 5,945,152 A | 8/1999 | Purser | |
| 6,017,832 A | 1/2000 | Yahiaoui et al. | |
| 6,027,804 A | 2/2000 | Chou et al. | |
| 6,028,016 A | 2/2000 | Yahiaoui et al. | |
| 6,060,557 A | 5/2000 | Dahmen et al. | |
| 6,060,638 A | 5/2000 | Paul et al. | |
| 6,071,580 A | 6/2000 | Bland et al. | |
| 6,106,775 A | 8/2000 | Fuller | |
| 6,117,464 A | 9/2000 | Moore et al. | |
| 6,143,821 A | 11/2000 | Houben | |
| 6,152,295 A | 11/2000 | Brander et al. | |
| 6,166,285 A | 12/2000 | Schulte et al. | |
| 6,171,695 B1 | 1/2001 | Fontenot et al. | |
| 6,196,960 B1 | 3/2001 | Owensby | |
| 6,204,208 B1 | 3/2001 | Krzysik et al. | |
| 6,207,210 B1 | 3/2001 | Bender et al. | |
| 6,248,309 B1 | 6/2001 | Iyer et al. | |
| 6,300,258 B1 | 10/2001 | Stano et al. | |
| 6,325,969 B1 | 12/2001 | Aamodt et al. | |
| 6,340,654 B1 | 1/2002 | Iijima | |
| 6,350,710 B1 | 2/2002 | Jonas et al. | |
| 6,376,034 B1 | 4/2002 | Brander | |
| 6,376,043 B1 | 4/2002 | Handa et al. | |
| 6,403,857 B1 | 6/2002 | Gross et al. | |
| 6,451,365 B1 | 9/2002 | King et al. | |
| 6,476,104 B1 | 11/2002 | Nakamura et al. | |
| 6,478,147 B1 | 11/2002 | Brander et al. | |

(Continued)

FOREIGN PATENT DOCUMENTS

| | | |
|---|---|---|
| KR | 1020030074953 | 11/2003 |
| WO | 0032052 | 6/2000 |

OTHER PUBLICATIONS

Patent Cooperation Treaty, International Search Report for PCT/US07/88503; 2 pgs, Apr. 30, 2008.

*Primary Examiner*—Tae H Yoon
(74) *Attorney, Agent, or Firm*—Gardner Groff Greenwald & Villanueva, PC

(57) ABSTRACT

Described herein are food preservation compositions. The compositions are composed of an absorbent material and an antimicrobial agent. The antimicrobial agent can be a volatile, nonvolatile, or a combination thereof. The compositions are effective in reducing or preventing microbial growth in food storage articles.

27 Claims, 27 Drawing Sheets

U.S. PATENT DOCUMENTS

| | | |
|---|---|---|
| 6,482,344 B1 | 11/2002 | Messner et al. |
| 6,506,394 B1 | 1/2003 | Yahiaoui et al. |
| 6,596,191 B2 | 7/2003 | Sakamoto et al. |
| 6,613,364 B2 | 9/2003 | Begg et al. |
| 6,620,446 B2 | 9/2003 | King et al. |
| 6,734,157 B2 | 5/2004 | Radwanski et al. |
| 6,797,235 B2 | 9/2004 | Boldt |
| 6,849,609 B2 | 2/2005 | Morrision |
| 6,916,480 B2 | 7/2005 | Anderson et al. |
| 6,964,787 B2 | 11/2005 | Swart et al. |
| 6,964,788 B2 | 11/2005 | Phebus et al. |
| 6,983,575 B2 | 1/2006 | Longo |
| 6,986,429 B2 | 1/2006 | Naji et al. |
| 6,991,820 B2 | 1/2006 | Ming et al. |
| 6,998,369 B2 | 2/2006 | Hei et al. |
| 7,001,632 B2 | 2/2006 | Nauth et al. |
| 7,025,198 B2 | 4/2006 | Bekele et al. |
| 7,030,199 B1 | 4/2006 | Chmelir et al. |
| 7,052,775 B2 | 5/2006 | Dohrn et al. |
| 7,090,916 B2 | 8/2006 | Aamodt et al. |
| 7,115,321 B2 | 10/2006 | Soerens et al. |
| 7,173,086 B2 | 2/2007 | Smith et al. |
| 7,179,862 B2 | 2/2007 | Mertens et al. |
| 7,241,481 B2 | 7/2007 | Speer et al. |
| 7,473,739 B2 * | 1/2009 | Dairoku et al. .......... 525/327.6 |
| 2001/0008658 A1 | 7/2001 | Barmore et al. |
| 2001/0008965 A1 | 7/2001 | Kinn et al. |
| 2001/0023159 A1 | 9/2001 | Chen et al. |
| 2002/0051754 A1 | 5/2002 | Schroeder et al. |
| 2002/0192340 A1 | 12/2002 | Swart et al. |
| 2003/0021853 A1 | 1/2003 | Wei et al. |
| 2003/0047087 A1 | 3/2003 | Phebus et al. |
| 2003/0054072 A1 | 3/2003 | Merriman et al. |
| 2003/0054073 A1 | 3/2003 | DelDuca et al. |
| 2003/0068440 A1 | 4/2003 | Ottersbach et al. |
| 2003/0113421 A1 | 6/2003 | Wilson et al. |
| 2003/0135172 A1 | 7/2003 | Whitmore et al. |
| 2003/0176136 A1 | 9/2003 | Wadsworth |
| 2003/0203080 A1 | 10/2003 | Garavaglia et al. |
| 2003/0207000 A1 | 11/2003 | Merriman et al. |
| 2003/0215551 A1 | 11/2003 | Garwood |
| 2004/0043688 A1 | 3/2004 | Soerens et al. |
| 2004/0047760 A1 | 3/2004 | Boldt |
| 2004/0047952 A1 | 3/2004 | Merriman et al. |
| 2004/0048083 A1 | 3/2004 | Bamore et al. |
| 2004/0048371 A1 | 3/2004 | Shimp |
| 2004/0067182 A1 | 4/2004 | Kelly et al. |
| 2004/0071840 A1 | 4/2004 | Tewari |
| 2004/0081731 A1 | 4/2004 | Hood |
| 2004/0081781 A1 | 4/2004 | Corby et al. |
| 2004/0106693 A1 | 6/2004 | Kauffman et al. |
| 2004/0112769 A1 | 6/2004 | Perry |
| 2004/0137202 A1 | 7/2004 | Hamilton et al. |
| 2004/0146614 A1 | 7/2004 | Ottersbach et al. |
| 2004/0175473 A1 | 9/2004 | Nauth et al. |
| 2004/0175480 A1 | 9/2004 | Seman et al. |
| 2004/0180189 A1 | 9/2004 | Funk et al. |
| 2004/0234662 A1 | 11/2004 | Ben-Yehoshua |
| 2004/0243080 A1 | 12/2004 | Baer |
| 2005/0013951 A1 | 1/2005 | Mitchell et al. |
| 2005/0118310 A1 | 6/2005 | Lacroix |
| 2005/0154361 A1 | 7/2005 | Sabesan |
| 2005/0175748 A1 | 8/2005 | Thijssen et al. |
| 2005/0196492 A1 | 9/2005 | Muller et al. |
| 2005/0208083 A1 | 9/2005 | Annis |
| 2005/0220374 A1 | 10/2005 | Thomas et al. |
| 2005/0220375 A1 | 10/2005 | Thomas |
| 2005/0226967 A1 | 10/2005 | Bringley et al. |
| 2005/0234413 A1 | 10/2005 | Funk et al. |
| 2005/0271780 A1 | 12/2005 | Schroeder et al. |
| 2006/0016739 A1 | 1/2006 | Naji et al. |
| 2006/0024414 A1 | 2/2006 | Turek et al. |
| 2006/0047069 A1 | 3/2006 | Jakob et al. |
| 2006/0110080 A1 | 5/2006 | Thomas et al. |
| 2006/0147588 A1 | 7/2006 | Garwood |
| 2006/0172048 A1 | 8/2006 | Etchells et al. |
| 2006/0188464 A1 | 8/2006 | Bochot et al. |
| 2006/0246242 A1 | 11/2006 | Siegel et al. |
| 2007/0014953 A1 | 1/2007 | Siegel et al. |
| 2007/0048415 A1 | 3/2007 | Etchells et al. |
| 2009/0186096 A1 * | 7/2009 | Kritzman et al. ............ 424/523 |

* cited by examiner

Effect of Citric Acid and Potassium Sorbate on Total Bacterial Count of 30 ml Tomato Juice at 4 °C Effect of Citric Acid and Potassium Sorbate on Total Aerobic Count of 20 ml Tomato Juice at 4 °C Effect of Citric Acid and Potassium Sorbate on Yeast and Mold Count of 30 ml Tomato Juice at 4 °C Effect of Citric Acid and Potassium Sorbate Combination on Yeast and Mold Count of 20 ml Tomato Juice at 4 °C Effect of Citric Acid and Potassium Sorbate on Yeast and Mold Count of 20 ml Tomato Juice at 4 °C Effect of potassium sorbate and citric acid individually and in combination on behavior of Salmonella in pasteurized tomato juice in absorbent at 4 °C Effect of potassium sorbate and citric acid individually and in combination on *Escherichia coli* O157:H7 in pasteurized tomato juice in absorbent at 4 °C Effect of potassium sorbate and citric acid individually and in combination on behavior of *Listeria monocytogenes* in pasteurized tomato juice in absorbent at 4 °C Effect of potassium sorbate and citric acid on aerobic microflora of unpasteurized tomato juice in absorbent at 4 °C Effect of potassium sorbate on aerobic plate Count of unpasteurized tomato juice at 4 °C Effect of potassium sorbate on behavior of *E. coli* O157:H7 in tomato juice at 4 °C Effect of potassium sorbate on behavior of *Listeria monocytogenes* in tomato juice at 4 °C Levels of Salmonella (Log CFU/g) in MCT-2 (absorbent & Potassium Sorbate) and drip from ribbed bottom tray after 6 and 11 days of tomato storage.

Levels of E. coli O157:H7 (Log CFU/g) in MCT-2 (absorbent & Potassium Sorbate) and drip from ribbed bottom trays after 6 and 11 days of tomato storage.

Levels of *Listeria monocytogenes* (Log CFU/g) in the MCT-2 (absorbent & Potassium Sorbate) and drip from ribbed bottom trays after 6 and 11 days of tomato storage.

US 7,863,350 B2

FOOD PRESERVATION COMPOSITIONS AND METHODS OF USE THEREOF

CROSS REFERENCE TO RELATED APPLICATIONS

This application claims priority upon U.S. provisional application Ser. No. 60/881,679, filed Jan. 22, 2007. This application is hereby incorporated by reference in its entirety for all of its teachings.

BACKGROUND

Food products such as meat, poultry, fruit, and vegetables are typically stored and sold in a supporting tray that is overwrapped by a transparent plastic film, enabling visual inspection of the food products. These food products generally produce an exudate (i.e., juices), which can be a source for the growth of microbial agents. The prevention of microbial agent growth improves food safety as a well as prolongs the freshness of the food product.

In general, in order to avoid the uncontrolled accumulation of exuded fluids from the food products, an absorbent pad is placed in the supporting tray. For example, the simplest type of absorbent pad for absorbing food product fluids is composed of a bundle of sheets of absorbent paper with or without a sheet of plastic film below the bundle. Another sheet of plastic film may also be placed over the bundle of paper sheets. One or both of the sheets of plastic film typically are perforated or are otherwise fluid pervious. A disadvantage of absorbent pads is that the pads have a low absorbency and do not retain moisture under pressure. In addition these types of pads tend to break up in use so that paper and the contents of the pad may adhere to the food and leakage may occur from the packages.

Thus, it would be desirable to have a food preservation composition having improved absorbency properties. Additionally, the food preservation composition should prevent or reduce the growth of microbial agents produced by food products. It would be desirable to prevent or reduce the growth of microbial agents not only in the exudate produced by the food product but also on the surface of the food product. This will ultimately prolong the shelf life of the food product. Finally, the food preservation composition should be easy to handle so that it can be incorporated into a variety of food storage articles. The food preservation compositions described herein satisfy these needs.

SUMMARY

Described herein are food preservation compositions. The compositions are composed of an absorbent material and an antimicrobial agent. The antimicrobial agent can be a volatile, nonvolatile, or a combination thereof. The compositions are effective in reducing or preventing microbial growth in food storage articles. The advantages of the invention will be set forth in part in the description which follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE DRAWINGS

The accompanying drawings, which are incorporated in and constitute a part of this specification, illustrate several aspects described below.

DETAILED DESCRIPTION

Figure 1:
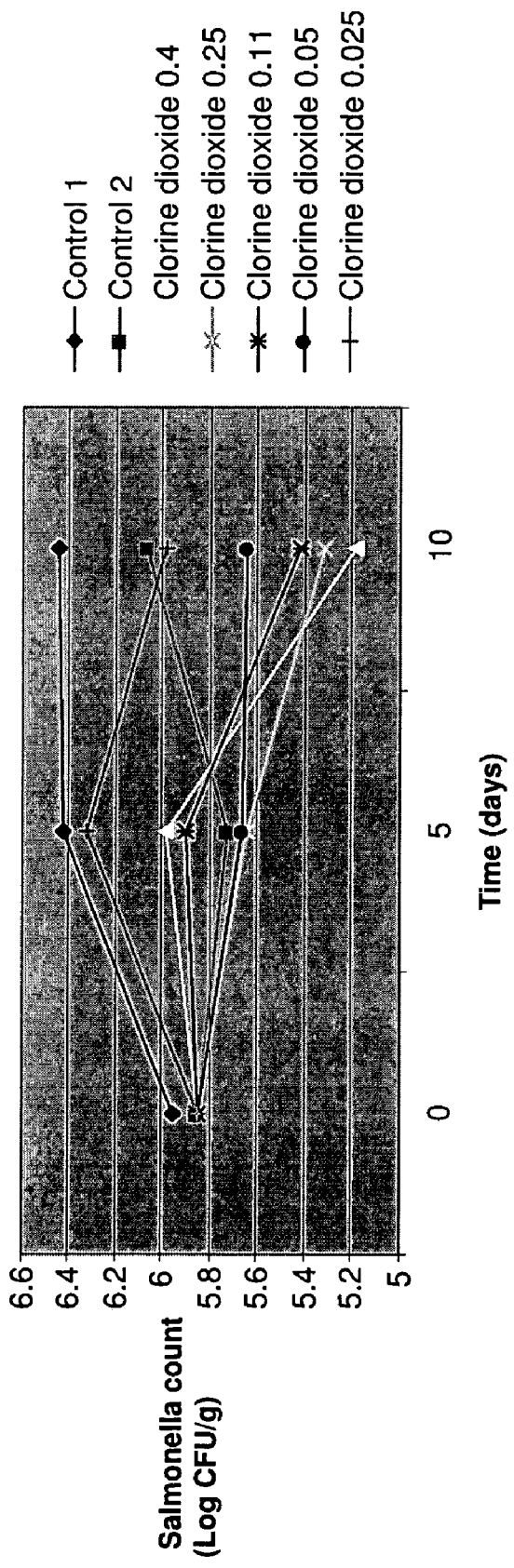
FIG. 1 shows the effect of chlorine dioxide on *Salmonella* on sliced packaged tomato at 4° C.
Figure 2:
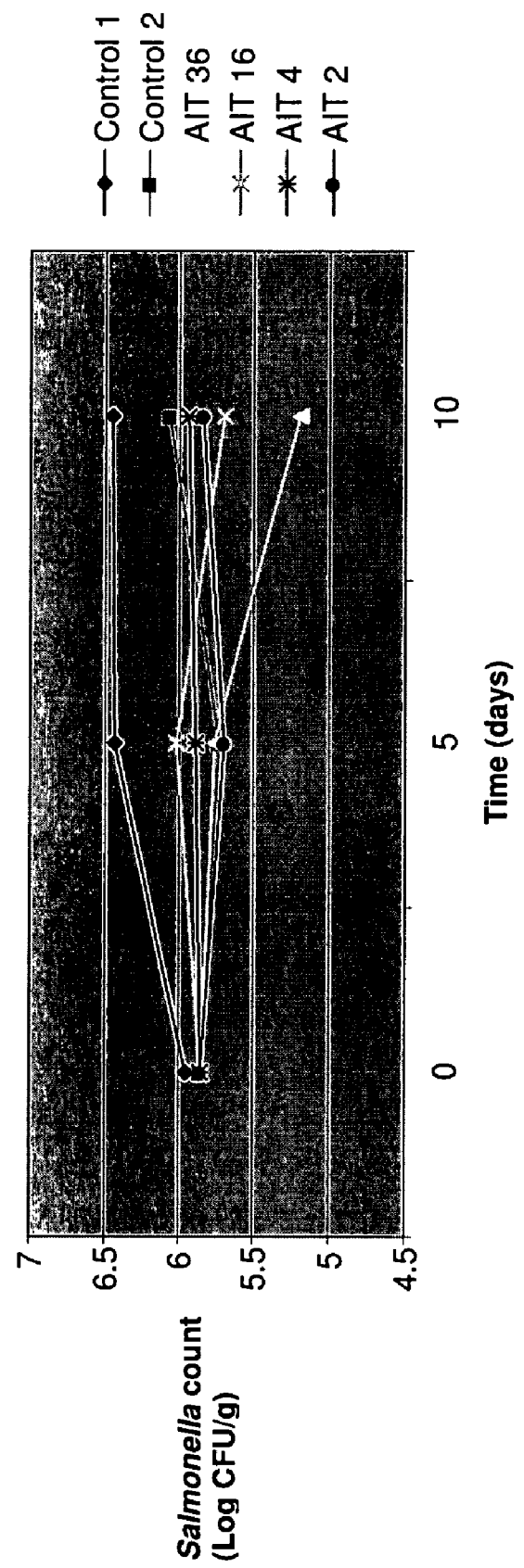
FIG. 2 shows the effect of allyl isothiocyanate cyclodextrine on *Salmonella* on sliced packaged tomato at 4° C.
Figure 3:
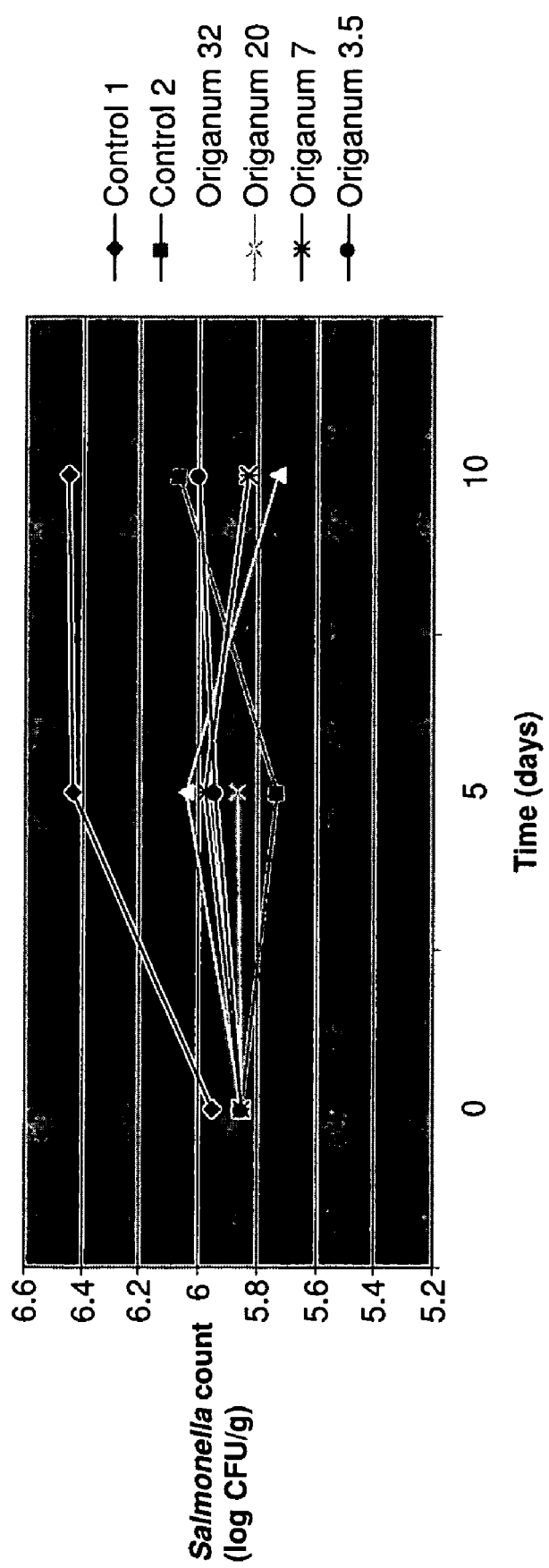
FIG. 3 shows the effect of *origanum* cyclodextrine on *Salmonella* on sliced packaged tomato at 4° C.
Figure 4:
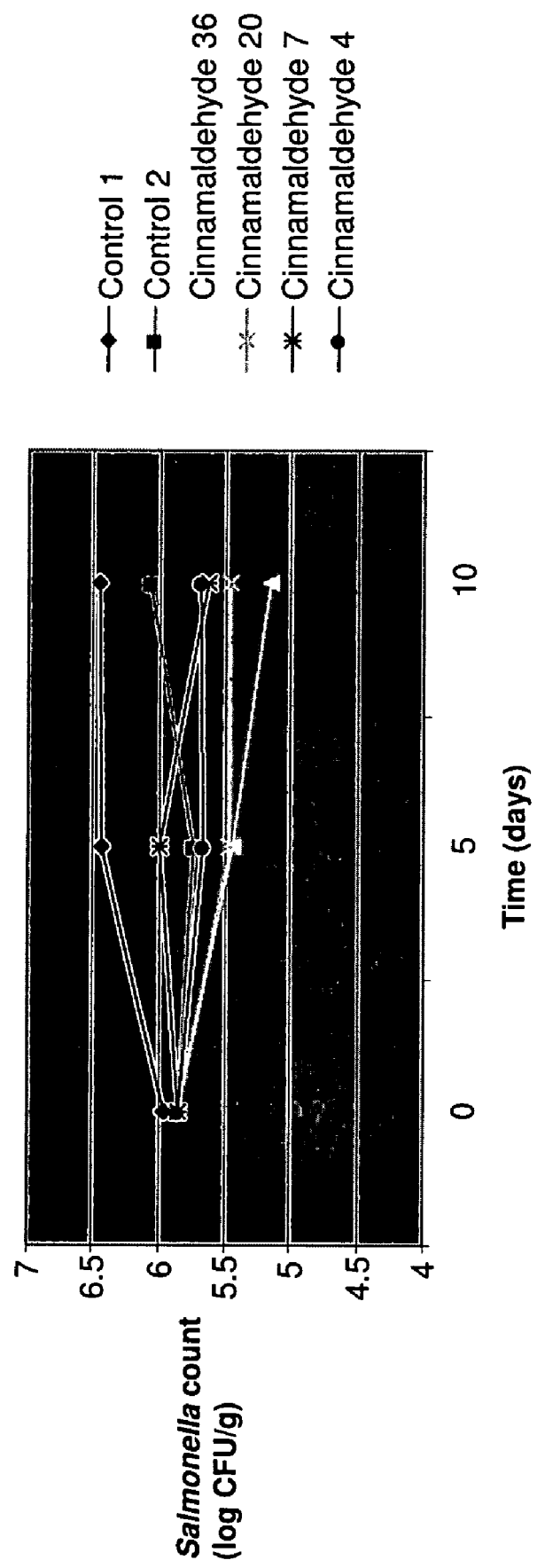
FIG. 4 shows the effect of cinnamaldehyde cyclodextrine on *Salmonella* on sliced packaged tomato at 4° C.
Figure 5:
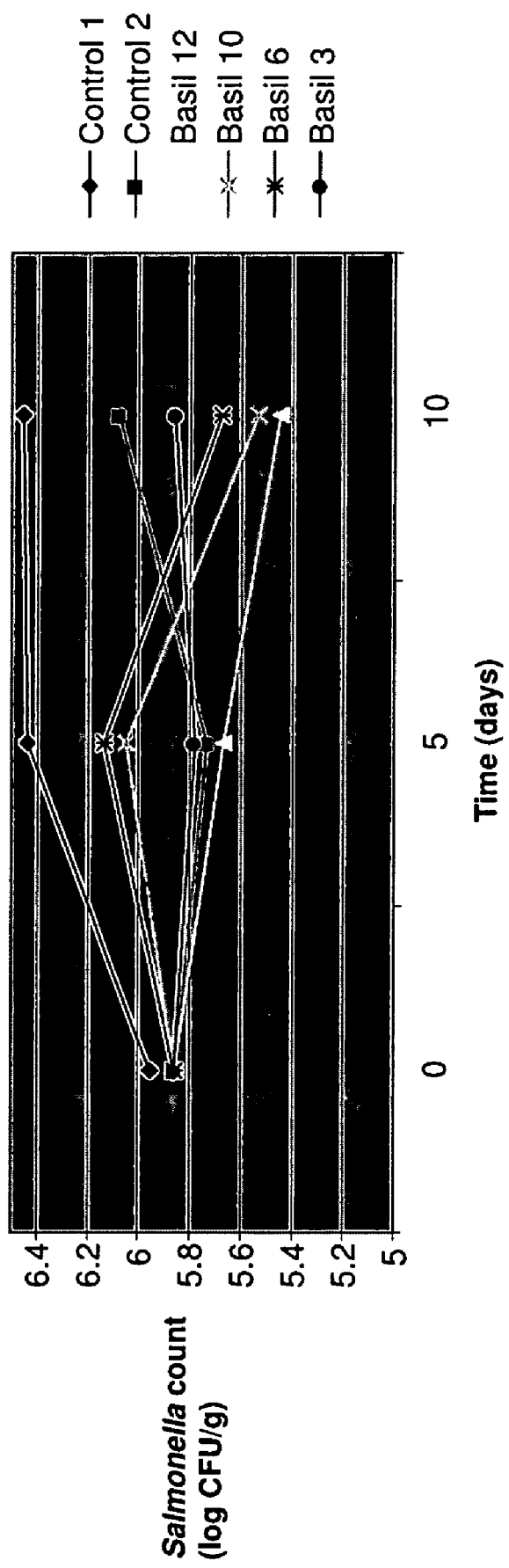
FIG. 5 shows the effect of basil cyclodextrine on *Salmonella* on sliced packaged tomato at 4° C.
Figure 6:
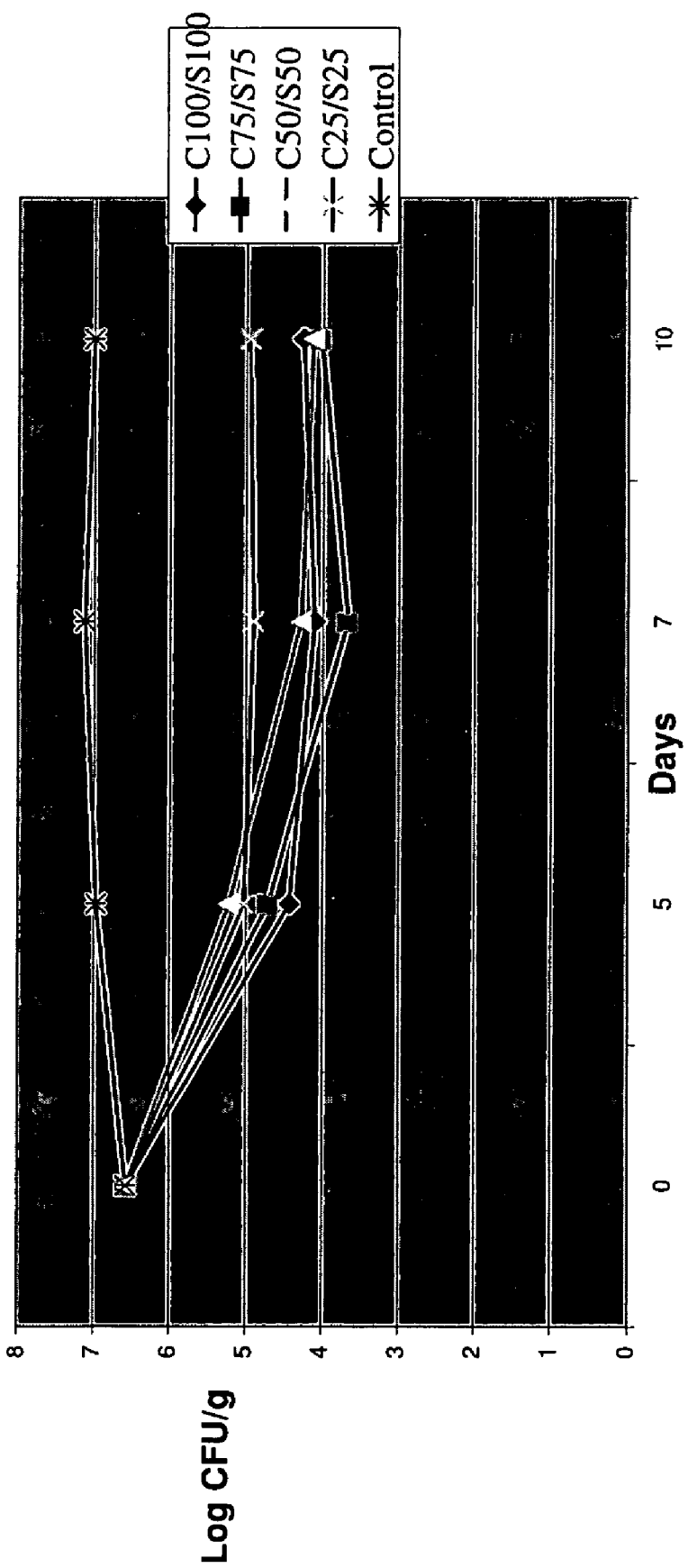
FIG. 6 shows the effect of the combination citric acid and potassium sorbate on the total aerobic count of 30 mL of tomato juice at 4° C.
Figure 7:
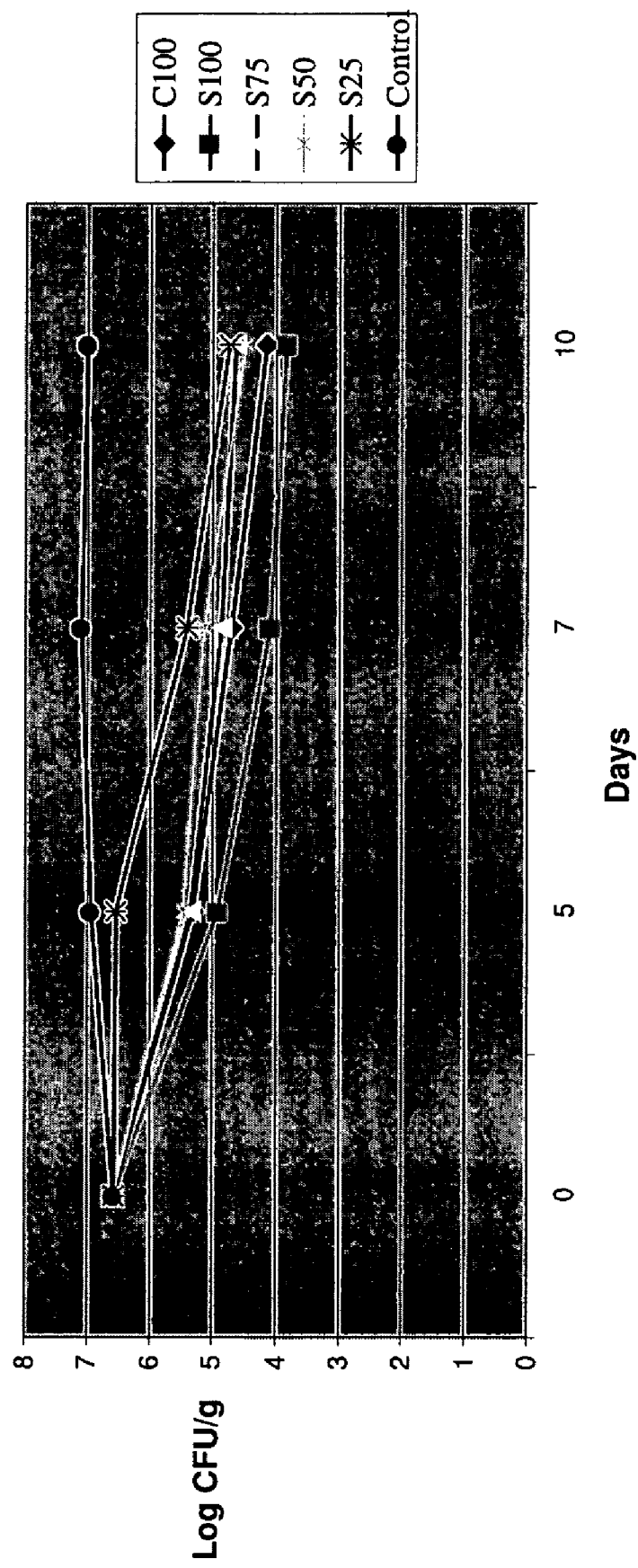
FIG. 7 shows the effect of citric acid and potassium sorbate on the total bacterial count of 30 mL of tomato juice at 4° C.
Figure 8:
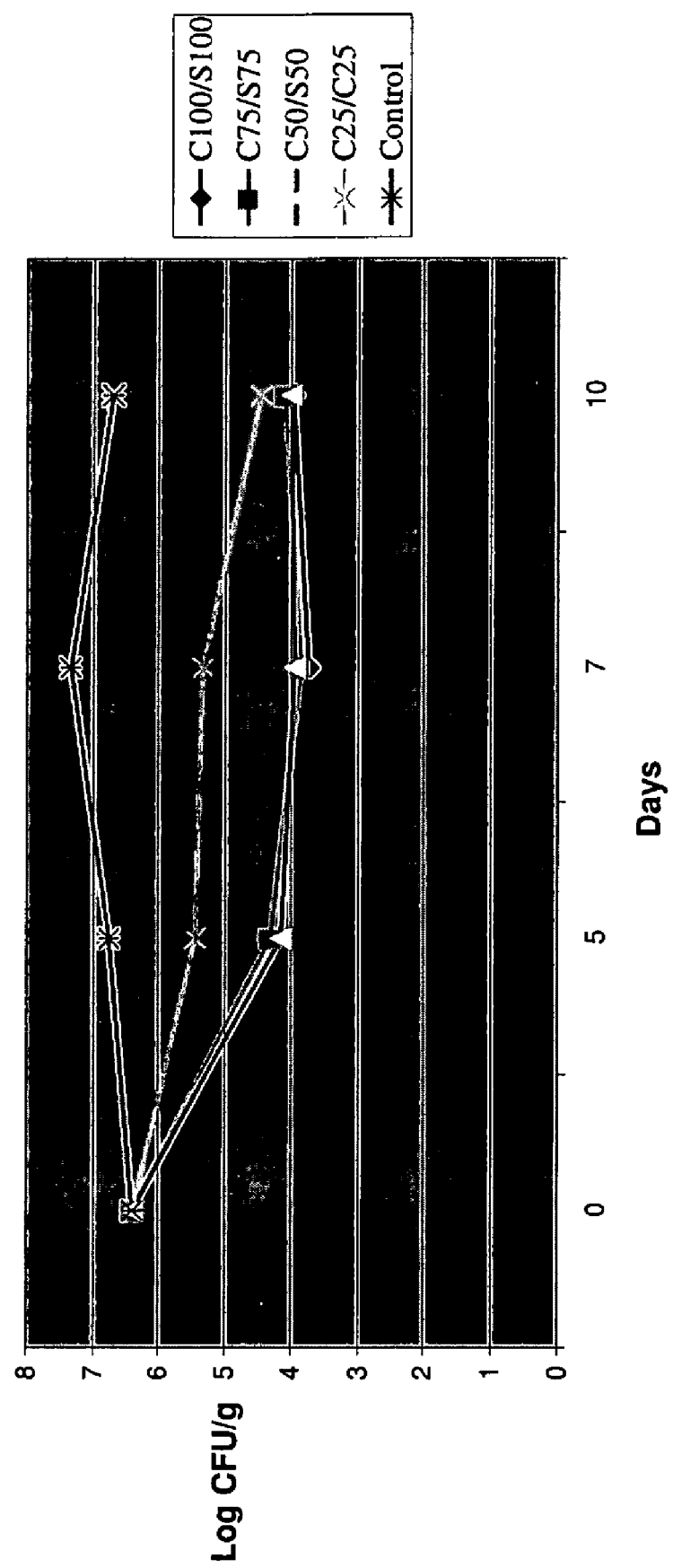
FIG. 8 shows the effect of citric acid and potassium sorbate on the total aerobic count of 20 mL of tomato juice at 4° C.
Figure 9:
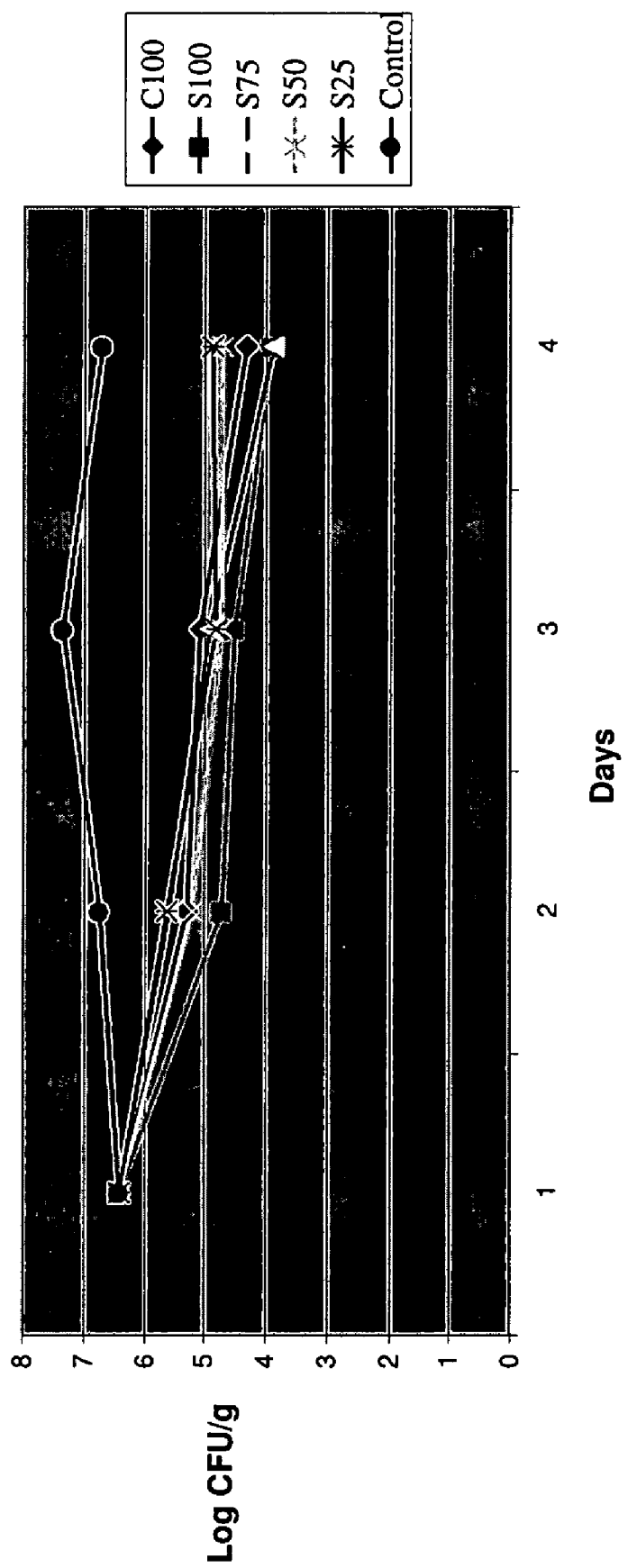
FIG. 9 shows the effect of citric acid and potassium sorbate on the total bacterial count of 20 mL of tomato juice at 4° C.
Figure 10:
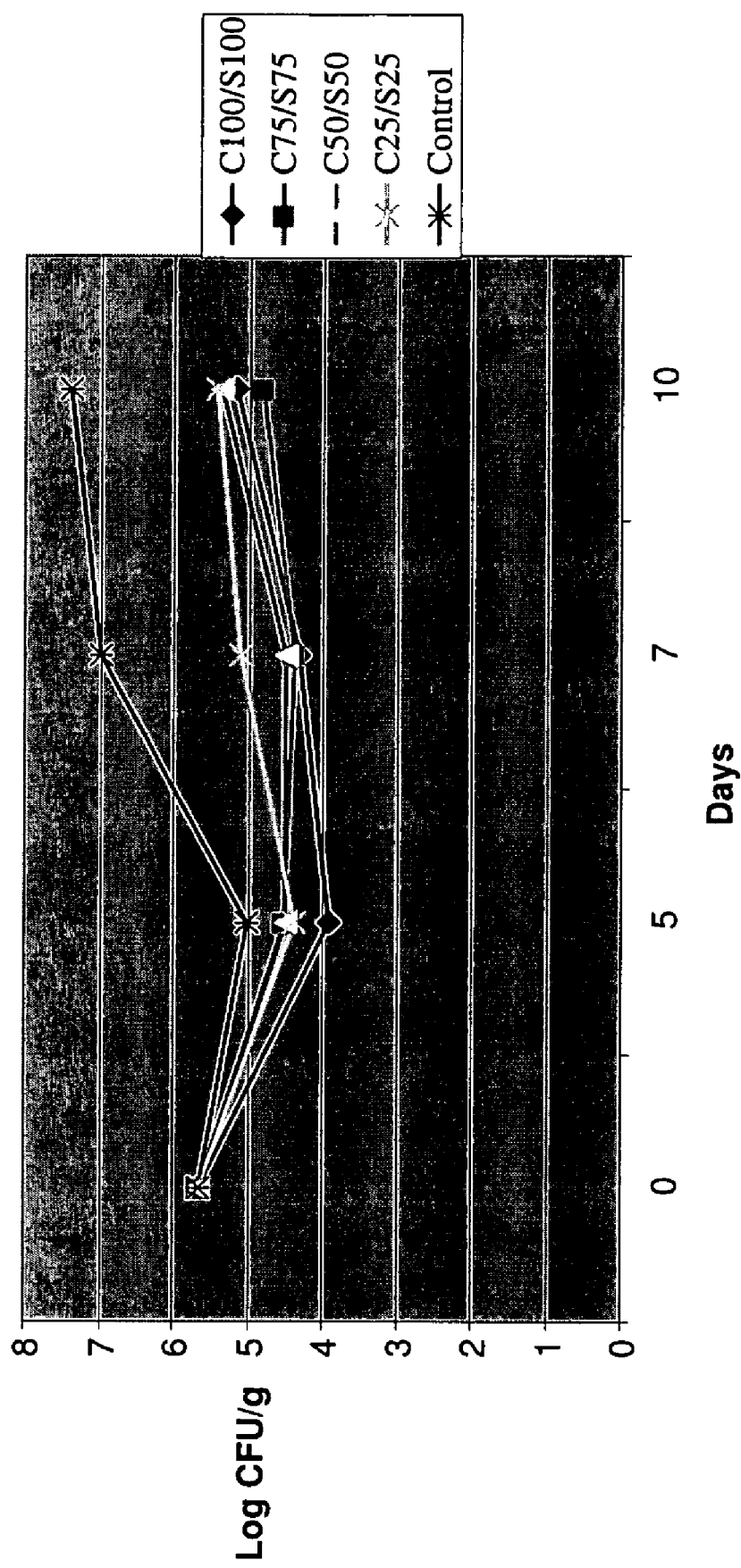
FIG. 10 shows the effect of the combination of citric acid and potassium sorbate on yeast and mold count of 30 mL of tomato juice at 4° C.
Figure 11:
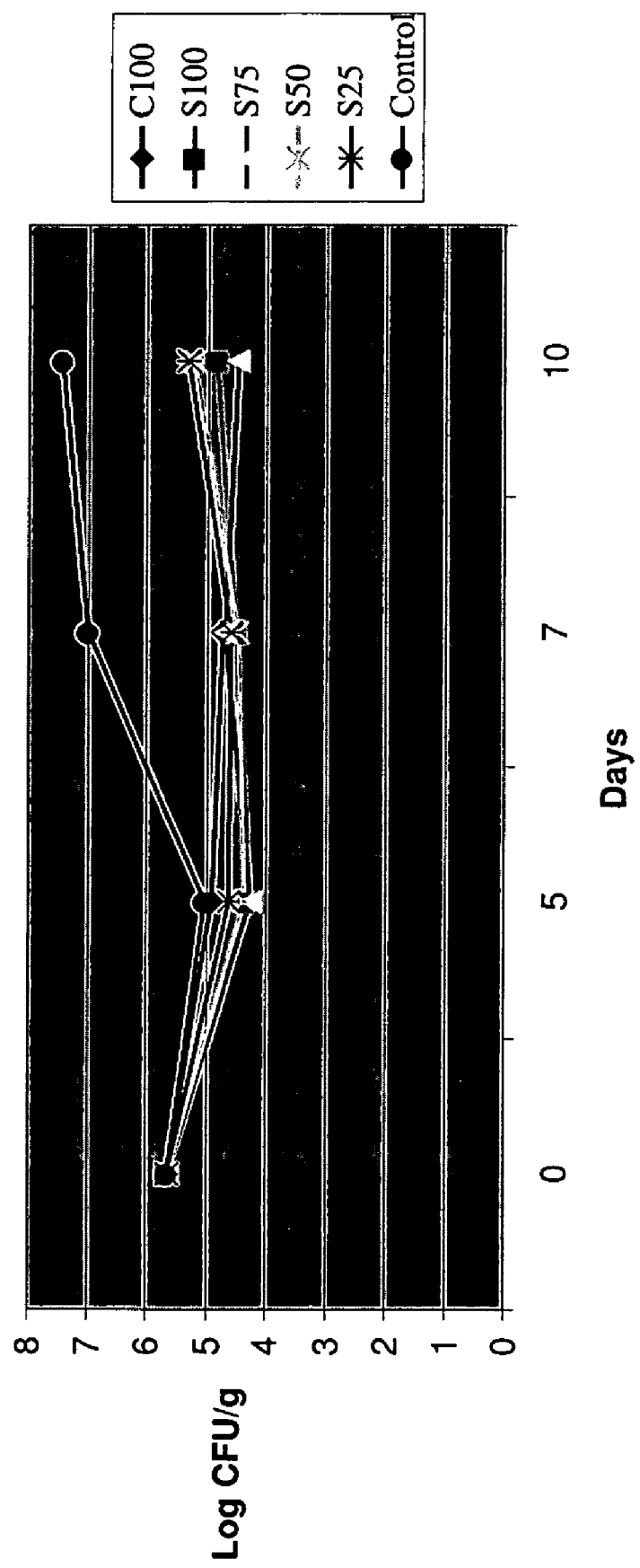
FIG. 11 shows the effect of citric acid and potassium sorbate on yeast and mold count of 30 mL of tomato juice at 4° C.
Figure 12:
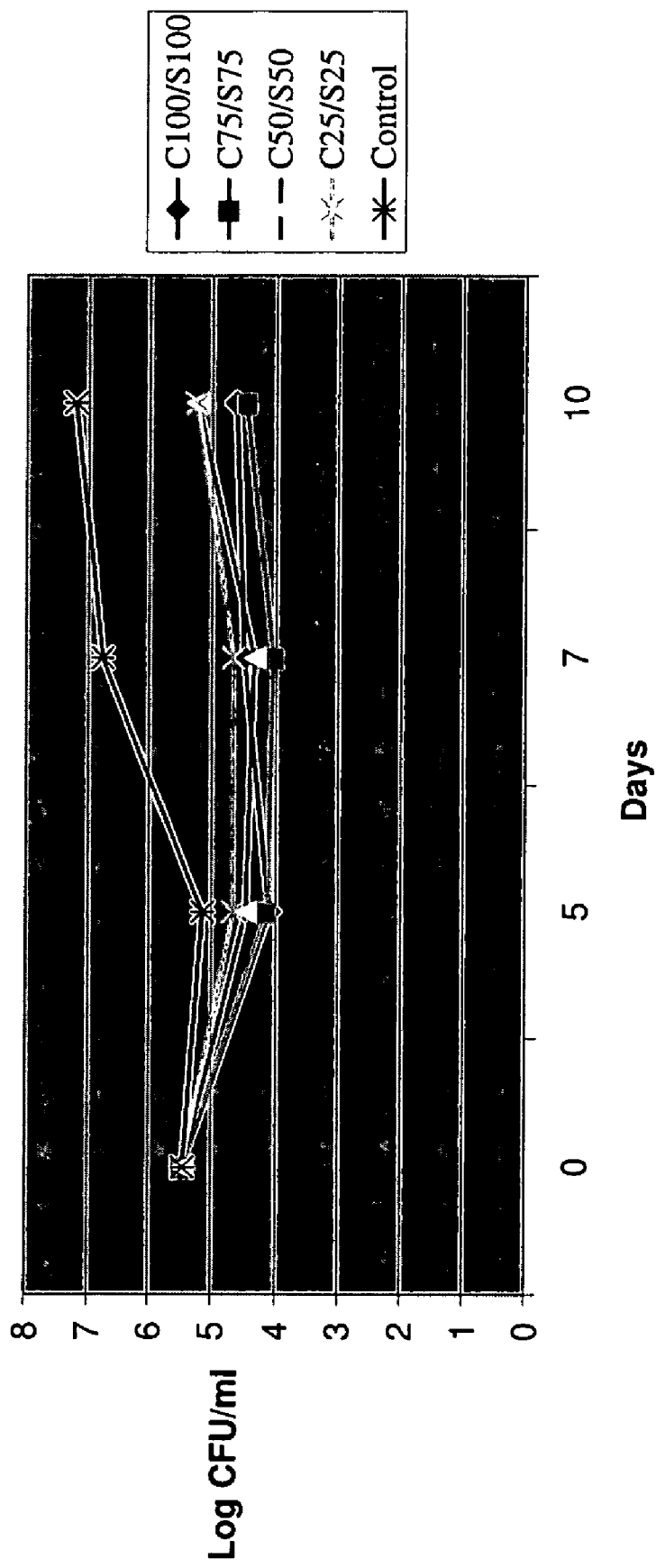
FIG. 12 shows the effect of the combination citric acid and potassium sorbate on yeast and mold count of 20 mL of tomato juice at 4° C.
Figure 13:
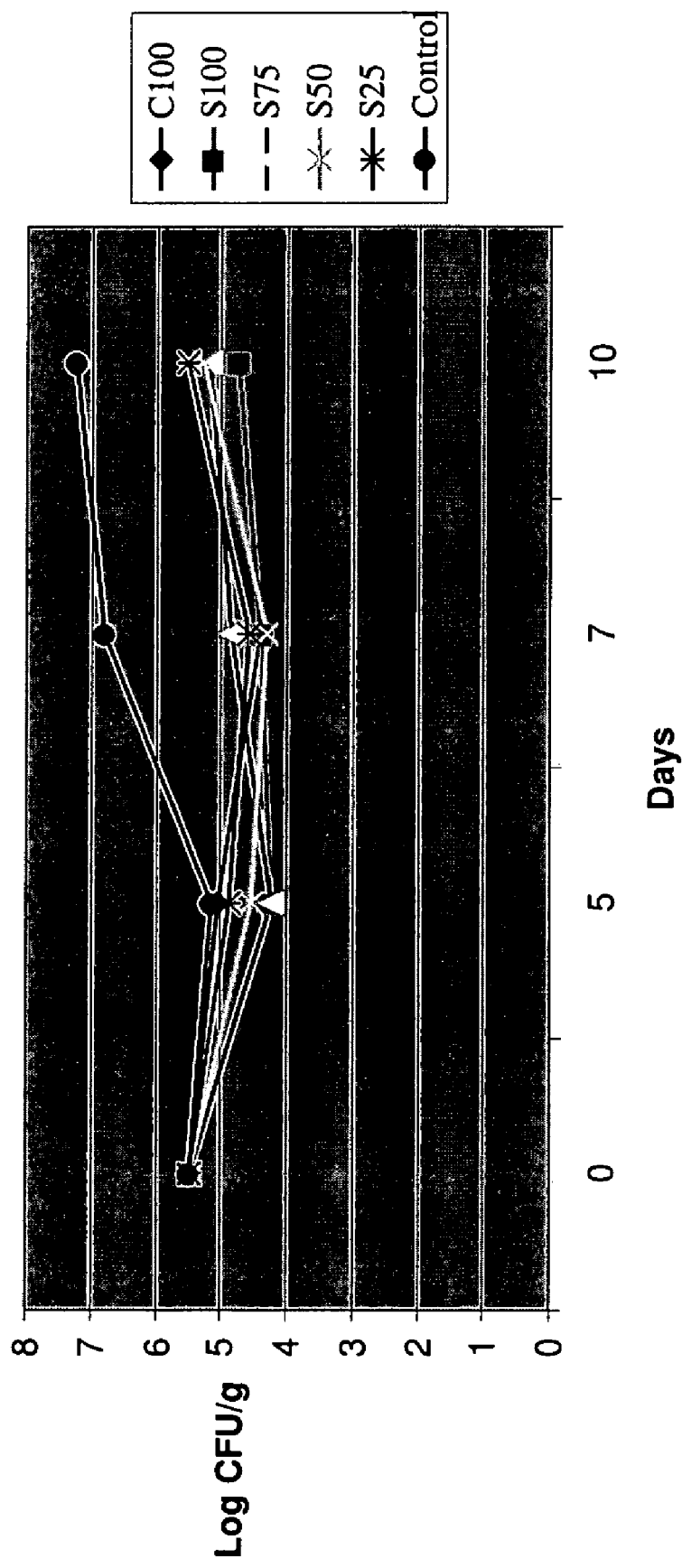
FIG. 13 shows the effect of citric acid and potassium sorbate on yeast and mold count of 20 mL of tomato juice at 4° C.
Figure 14:
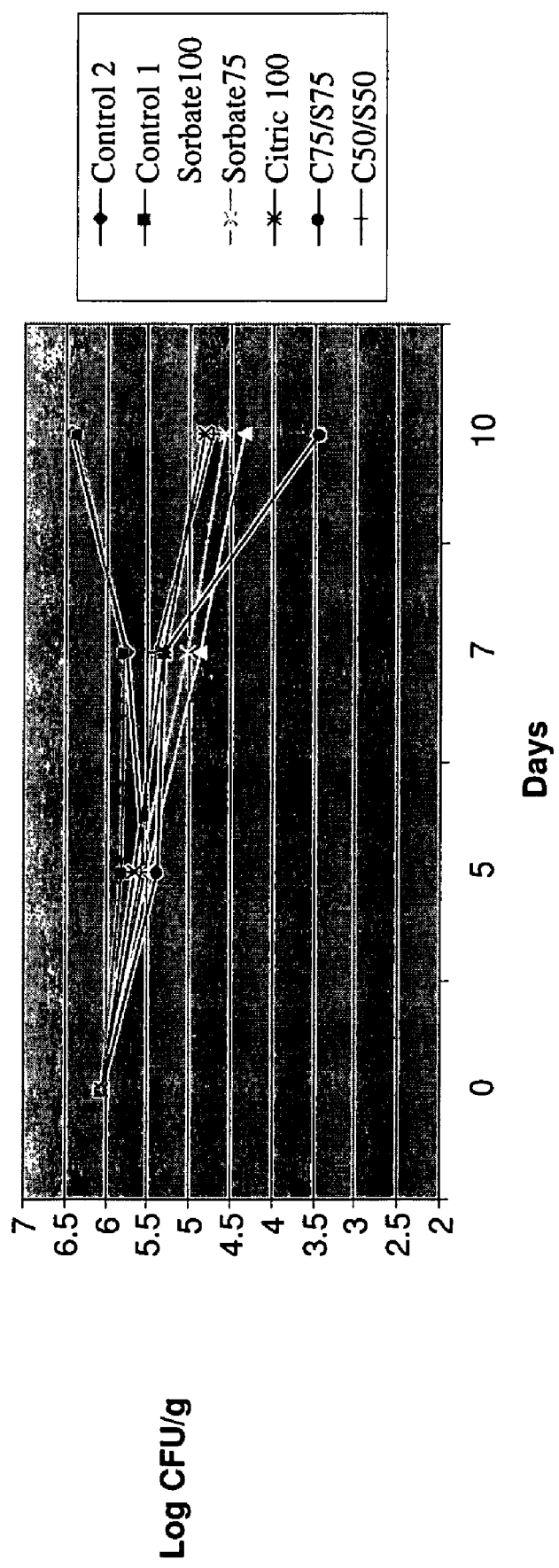
FIG. 14 shows the effect of citric acid and potassium sorbate separately and in combination on the behavior of *Salmonella* in pasteurized tomato juice in absorbent at 4° C.
Figure 15:
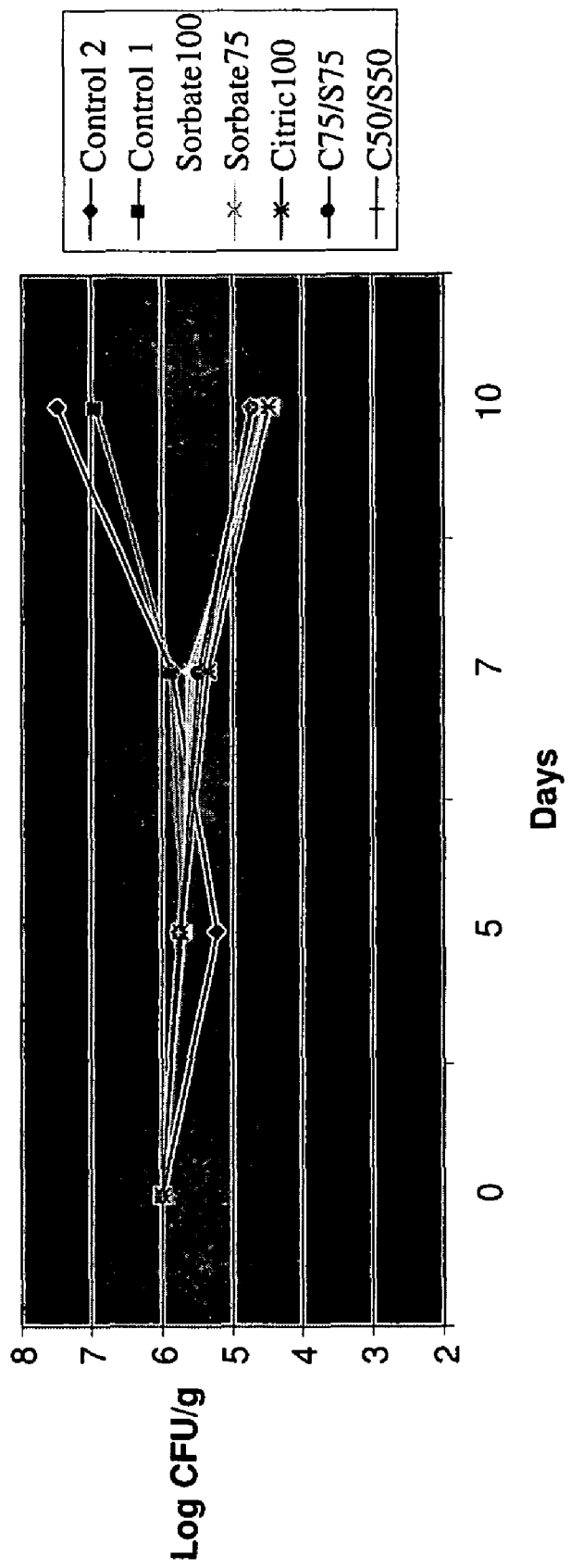
FIG. 15 shows the effect of citric acid and potassium sorbate separately and in combination on the behavior of *E. coli* in pasteurized tomato juice in absorbent at 4° C.
Figure 16:
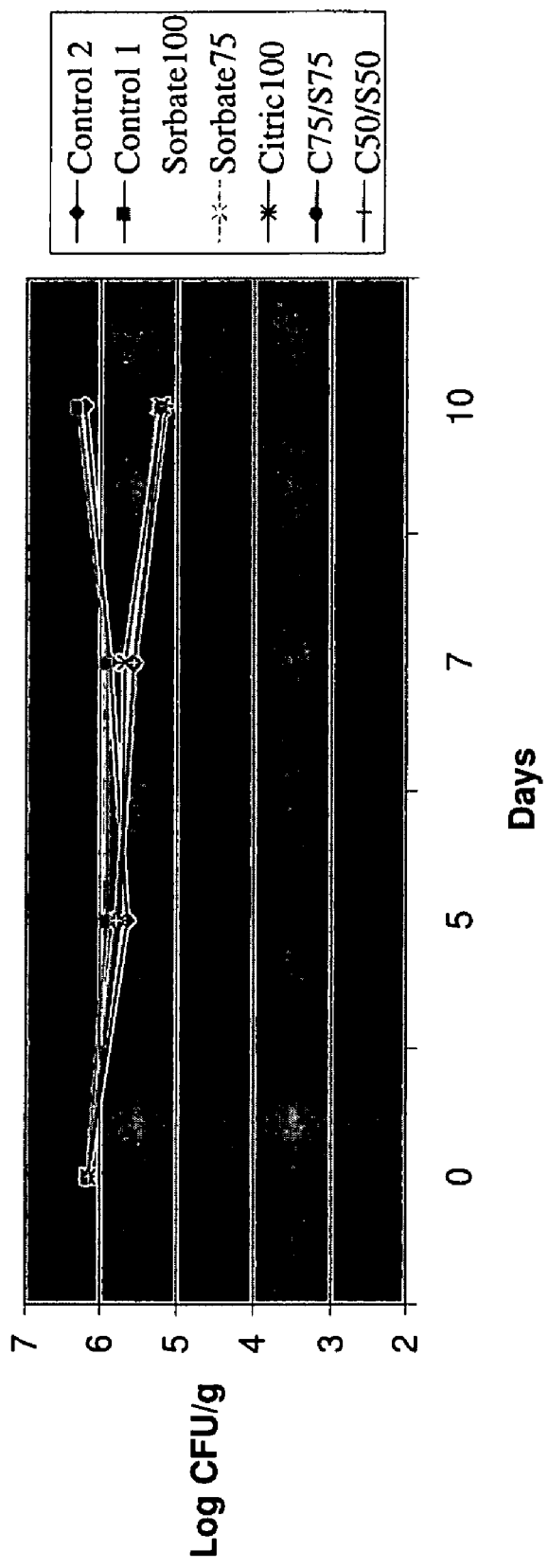
FIG. 16 shows the effect of citric acid and potassium sorbate separately and in combination on the behavior of *Listeria monocytogenes* in pasteurized tomato juice in absorbent at 4° C.
Figure 17:
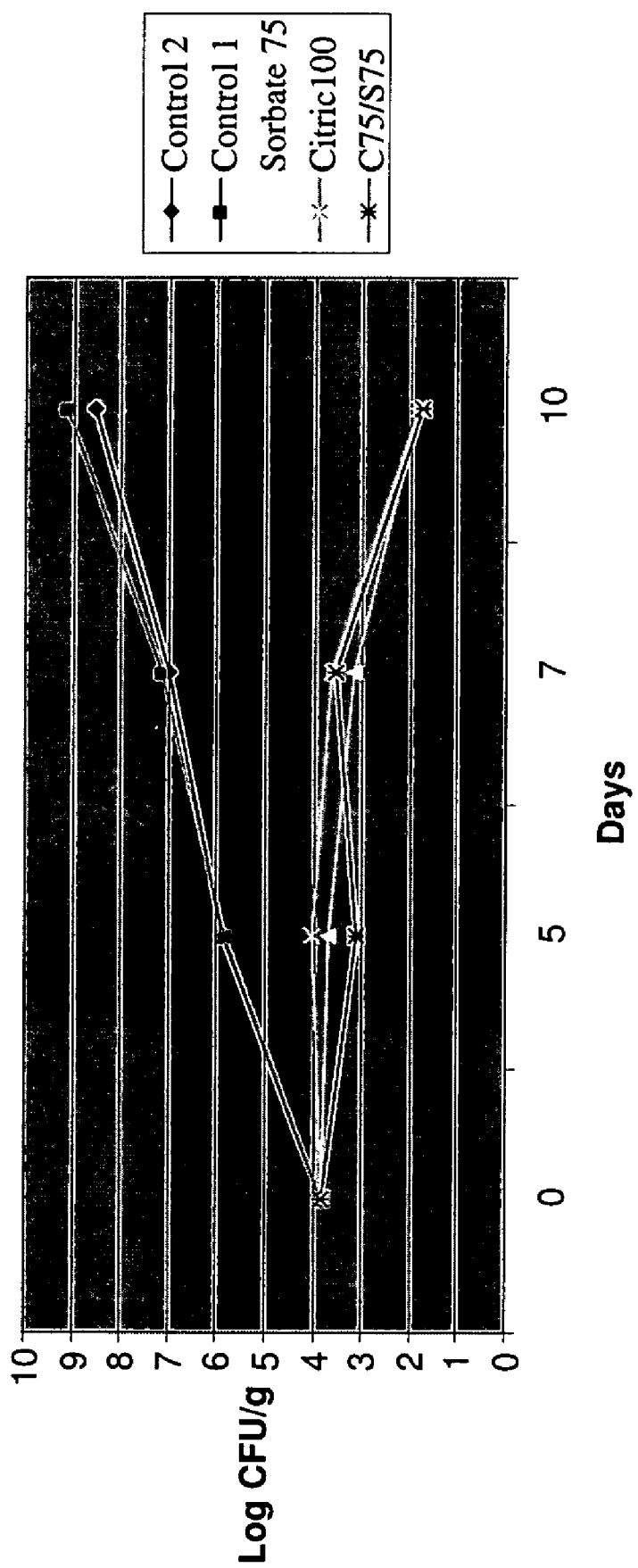
FIG. 17 shows the effect of citric acid and potassium sorbate on aerobic microflora of unpasteurized tomato juice in absorbent at 4° C.
Figure 18:
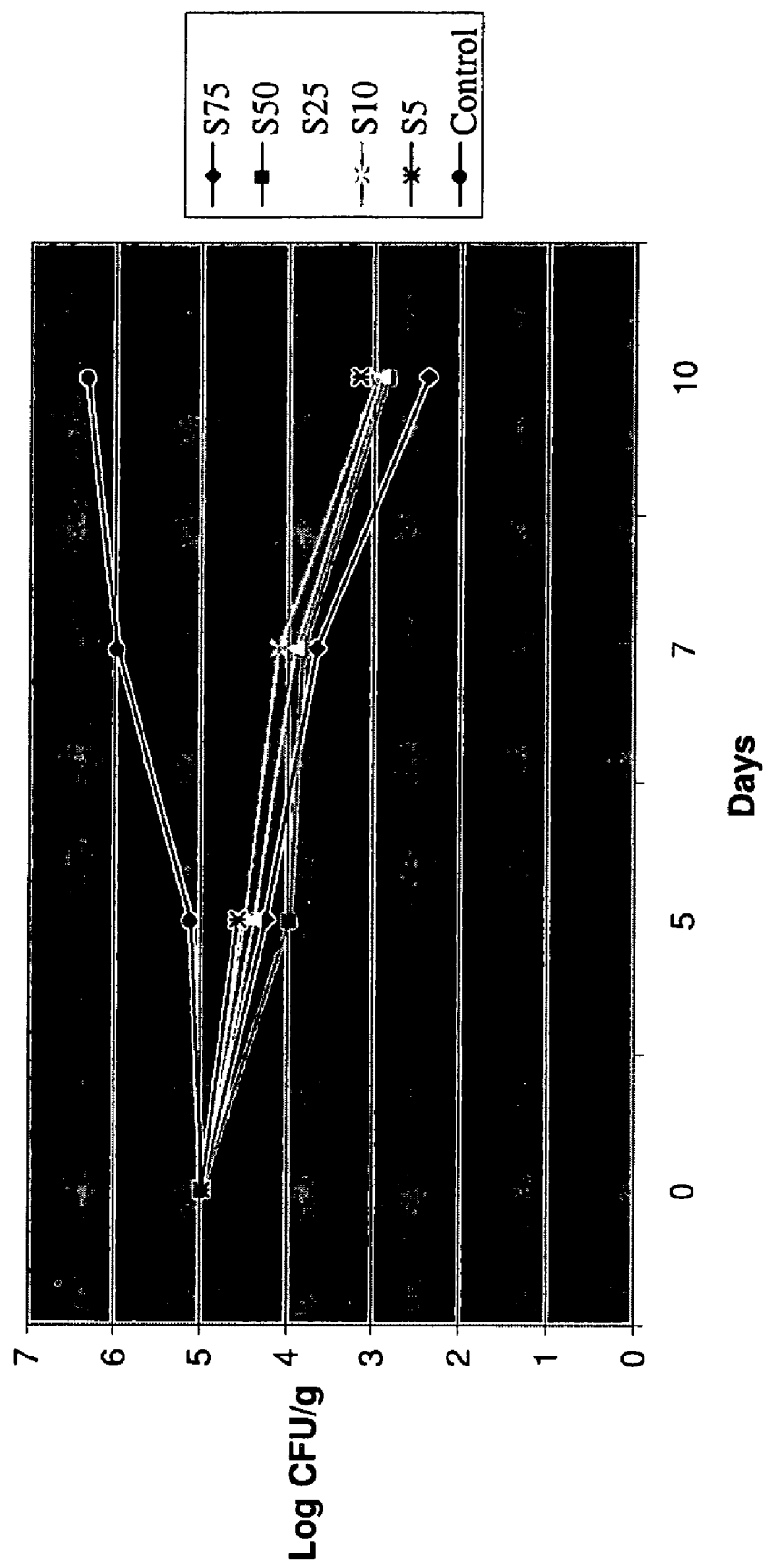
FIG. 18 shows the effect of citric acid and potassium sorbate on aerobic plate count of unpasteurized tomato juice in absorbent at 4° C.
Figure 19:
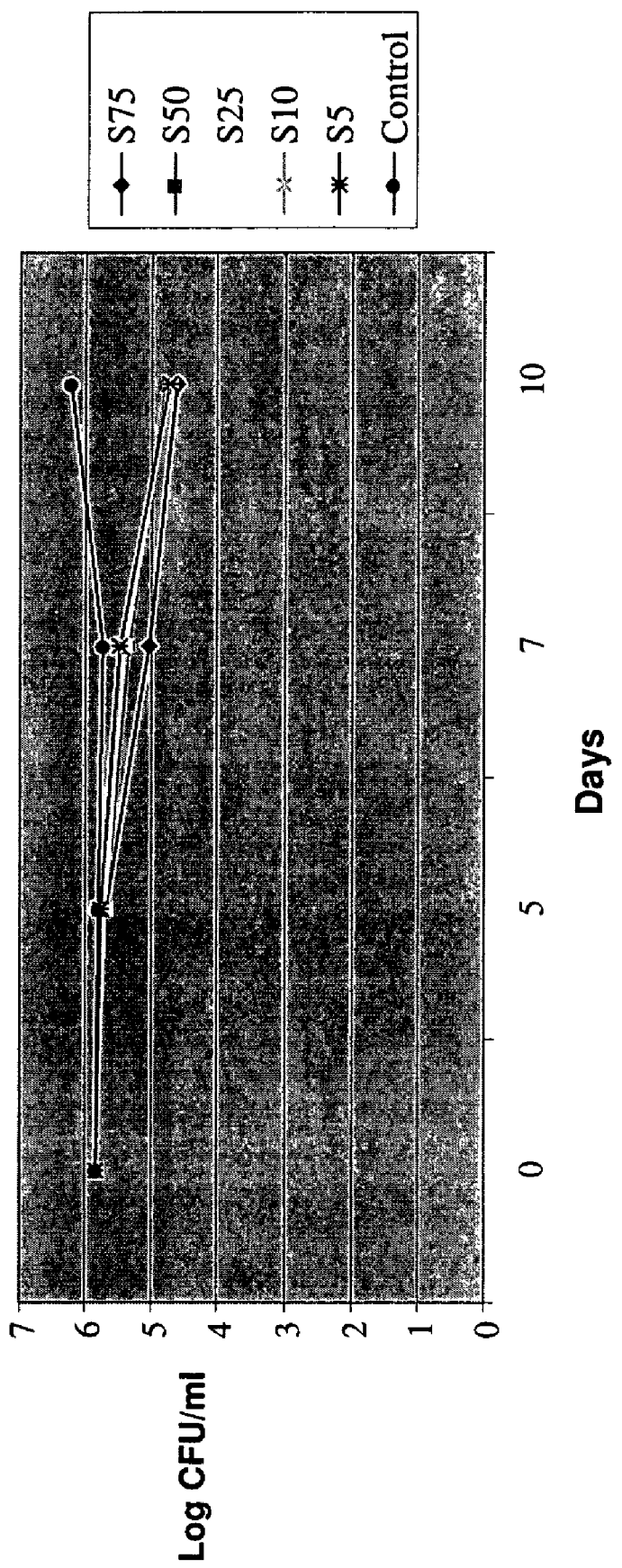
FIG. 19 shows the effect of potassium sorbate on the behavior of *Salmonella* in pasteurized tomato juice in absorbent at 4° C.
Figure 20:
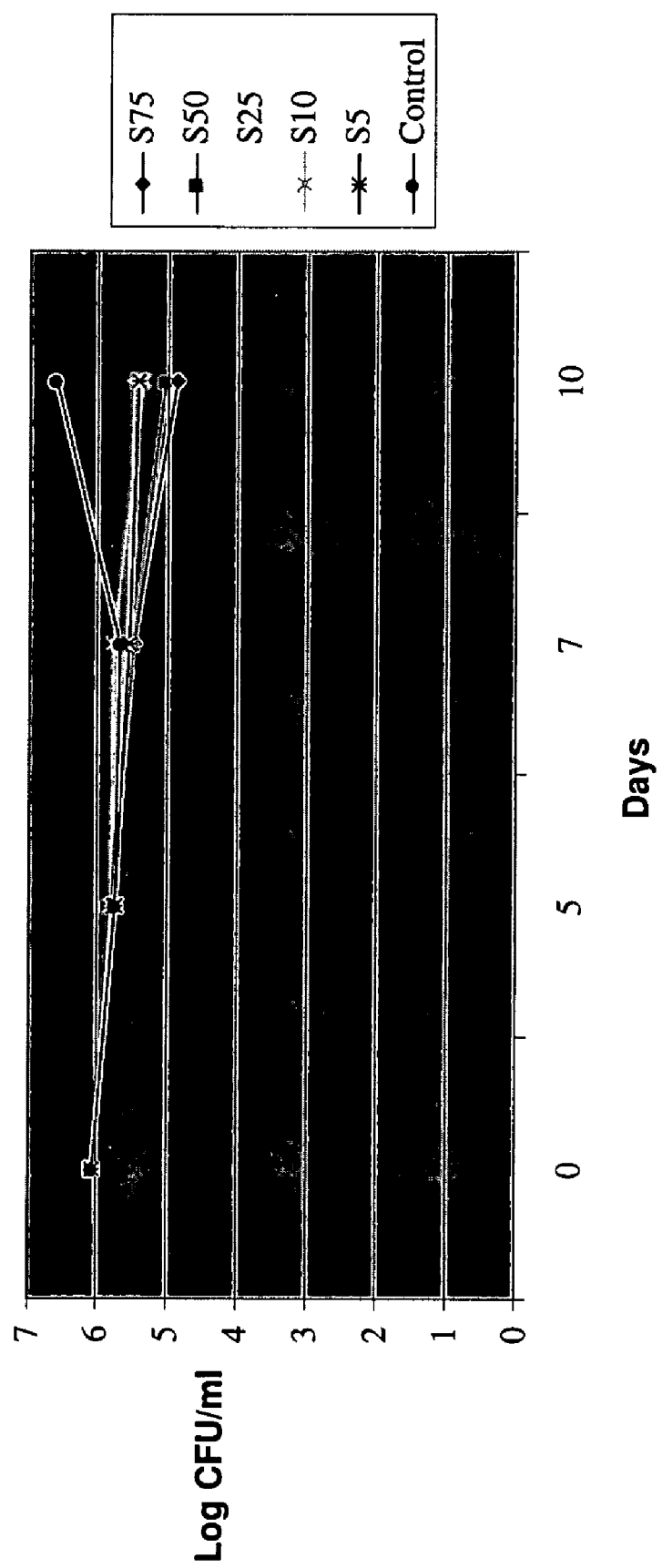
FIG. 20 shows the effect of potassium sorbate on the behavior of *E. coli* in pasteurized tomato juice in absorbent at 4° C.
Figure 21:
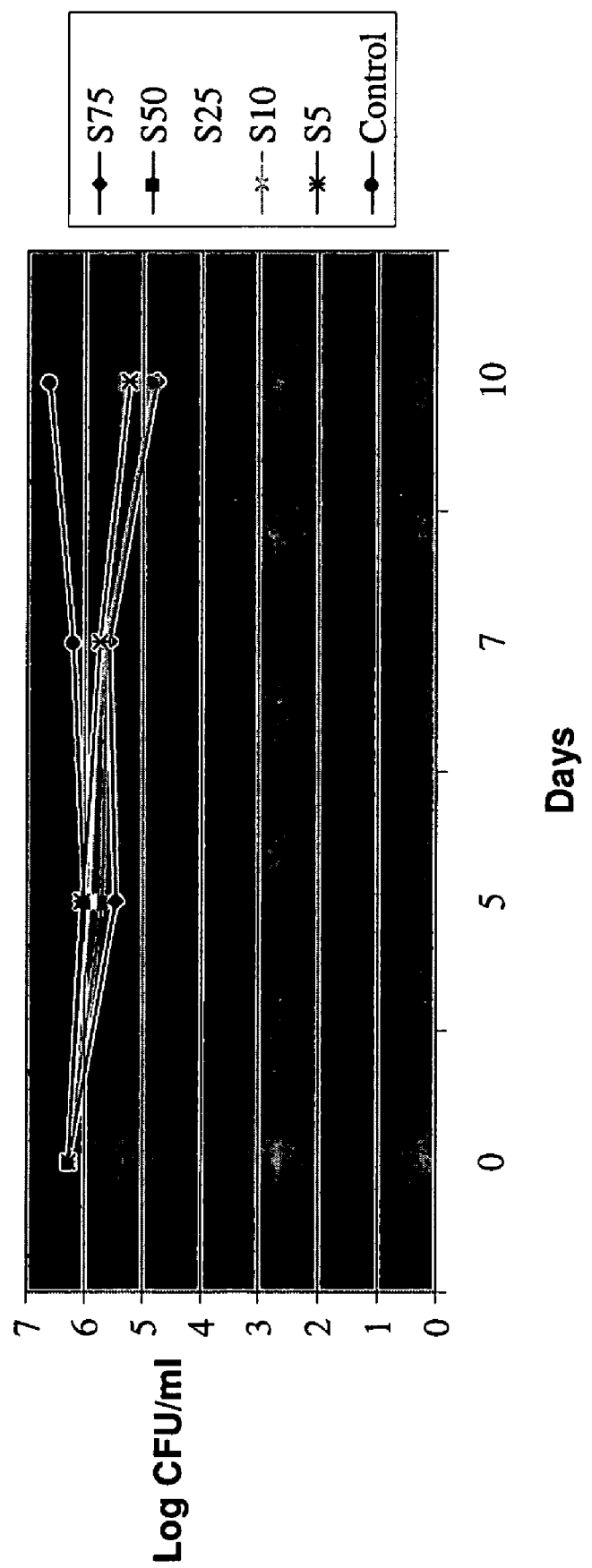
FIG. 21 shows the effect of potassium sorbate on the behavior of *Listeria monocytogenes* in pasteurized tomato juice in absorbent at 4° C.

Before the present compounds, compositions, and/or methods are disclosed and described, it is to be understood that the aspects described below are not limited to specific compounds, synthetic methods, or uses as such may, of course, vary. It is also to be understood that the terminology used herein is for the purpose of describing particular aspects only and is not intended to be limiting.

In this specification and in the claims that follow, reference will be made to a number of terms that shall be defined to have the following meanings:

It must be noted that, as used in the specification and the appended claims, the singular forms "a," "an" and "the" include plural referents unless the context clearly dictates otherwise. Thus, for example, reference to "an antimicrobial agent" includes mixtures of two or more such carriers, and the like.

"Optional" or "optionally" means that the subsequently described event or circumstance can or cannot occur, and that the description includes instances where the event or circumstance occurs and instances where it does not.

References in the specification and concluding claims to parts by weight, of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included.

Described herein are food preservation compositions and methods of making and using thereof. The compositions are composed of an absorbent composition and an antimicrobial agent. The absorbent composition and antimicrobial agent are described in detail below. Due to the fact that the compositions are used in food preservation applications, all components used to produce the absorbent compositions as well as the antimicrobial agent are selected from materials that are approved by the FDA as a food additives. The food preservation compositions described herein provide the necessary gel strength and absorbency criteria for food packaging applications with the additional benefits of an antimicrobial agent incorporated therein.

Absorbent Composition

The absorbent composition is composed of (i) at least one water-absorbing polymer; (ii) at least one mineral composition, and (iii) at least one water-soluble salt comprising at least one trivalent cation.

The water-absorbing polymer can be derived from natural sources or synthesized to meet specific requirements. In general, the water-absorbing polymer forms a gel upon contact with water. The water-absorbing polymers are also referred to herein as hydrogels. In certain aspects, the polymer comprises a non-crosslinked gel-forming water-soluble polymer. The amount of polymer present in the absorbent composition can be from 50% to 92, 50% to 80%, 60% to 80%, or 70% to 80% by weight of the food preservation composition.

Examples of water-absorbing polymers include, but are not limited to, carboxymethylcellulose (CMC) and or a salt thereof, hydroxyethylcellulose, methylcellulose, hydroxypropylmethylcellulose, gelatinized starches, gelatin, dextrose, gums, or any combination thereof. In one aspect, the water-absorbing polymer is the sodium salt of CMC having a degree of substitution of about 0.7 to 0.9, where the degree of substitution refers to the proportion of hydroxyl groups in the cellulose molecule that have their hydrogen substituted by a carboxymethyl group. In one aspect, CMC supplied by Dow Wolff Cellulosics (Willowbrook, Ill.) sold under the tradename Walocel CRT 6000) can be used herein.

In other aspects, the water-absorbing polymer can be the polymerization product of a carboxyl-containing ethylenically unsaturated monomer alone or in combination with one or more other ethylenically unsaturated monomers. Examples of carboxyl-containing ethylenically unsaturated monomers include, but are not limited to, acrylic acid, methacrylic acid, dimethacrylic acid, ethylacrylic acid, crotonic acid, isocrotonic acid, vinylacetic acid, allylacetic acid, maleic acid, fumaric acid, itaconic acid, methylenemalonic acid, maleic acid, maleic anhydride, itaconic acid, itaconic anhydride, or any combination thereof. Examples of ethylenically unsaturated monomers that can be copolymerized with the carboxyl-containing ethylenically unsaturated monomers include, but are not limited to, (meth)acrylamide, (meth)acrylonitrile, vinylpyrrolidone, vinylacetamide, 2-acrylamido-2-methylpropanesulfonic acid, vinylsulfonic acid, (meth)allylsulfonic acid, hydroxyethyl acrylate, alkylaminoalkyl(meth)acrylates, alkylaminopropylacrylamides, acrylamidopropyltrimethylammonium chloride, or any combination thereof. The polymers and techniques for making the same disclosed in U.S. Pat. Nos. 7,101,946 and 7,173,086 can be used herein.

In certain aspects, the polymerization products described above can be crosslinked using techniques known in the art. In other aspects, the polymerization product can be partially neutralized or completely neutralized with an alkali metal base or alkaline earth metal base. For example, the polymerization product can be polyacrylic acid partially neutralized with a sodium or potassium base (e.g., hydroxide).

The mineral composition is generally any material that is porous and traps water but does not swell such as the water-absorbing polymer. The mineral composition is from 3 to 30%, 10 to 30%, or 20 to 30% by weight of the food preservation composition. In one aspect, the mineral composition includes one or more clays. Examples of clays useful herein include, but are not limited to, attapulgite, montmorillonite, bentonite, hectorite, sericite, kaolin, diatomaceous earth, silica, and mixtures thereof. In one aspect, bentonite is used. Bentonite is a type of montmorillonite and is principally a colloidal hydrated aluminum silicate that contains varying quantities of iron, alkali, and alkaline earths. A type of bentonite useful herein is hectorite, which is mined from specific areas, principally in Nevada. In one aspect, bentonite manufactured by American Colloid Company of Arlington Heights, Ill. under the tradename Bentonite AE-H can be used herein.

The water-soluble salt used in the absorbent composition comprises at least one trivalent cation, which provides a cross linking effect on the water-absorbing polymer once the solution is added. In one aspect, the soluble salt is aluminum sulfate, potassium aluminum sulfate, and other soluble salts of metal ions such as aluminum, chromium, and the like. Additional salts that can be used in combination with the trivalent cation include calcium sulfate, potassium chloride, and sodium chloride. In one aspect, the soluble salt is from 1 to 20%, 1 to 15%, or from 1 to 8% by weight of the food preservation composition.

The absorbent composition can include additional components. For example, the composition can include one or more inorganic buffers such as sodium carbonate (soda ash), sodium hexametaphosphate, sodium tripolyphosphate, and other similar materials. Further, natural gums such as xanthan, guars, and alginates can be used as inorganic buffers Antimicrobial Agent One or more antimicrobial agents are admixed with the absorbent composition to produce the food preservation composition. The term "antimicrobial agent" is defined herein as any compound that inhibits or prevents the growth of microbes on or near a food article as well as kill microbes on and/or near the food article. The term "microbe" is defined herein as a bacterium, fungus, or virus. The selection of the antimicrobial agent can vary depending upon the end-use of the food preservation composition (e.g., the type of food, storage device, etc.). The antimicrobial agents useful herein include volatile antimicrobial agents and non-volatile antimicrobial agents. Combinations of the volatile and non-volatile antimicrobial agents are also contemplated and will be discussed below.

The term "volatile antimicrobial agent" includes any compound that when it comes into contact with a fluid (e.g., water or the juice from a food product), produces a vapor of antimicrobial agent. As will be discussed in greater detail below, the volatile antimicrobial agent is generally used in a closed system so that the antimicrobial vapor does not escape. In one aspect, the volatile antimicrobial agent is from 0.25 to 20%, 0.25 to 10%, or 0.25 to 5% by weight of the food preservation composition. Examples of volatile antimicrobial agents include, but are not limited to, *origanum*, basil, cinnamaldehyde, chlorine dioxide, vanillin, cilantro oil, clove oil, horseradish oil, mint oil, rosemary, sage, thyme, wasabi or an extract thereof, a bamboo extract, an extract from grapefruit seed, an extract of Rheum palmatum, an extract of coptis chinesis, lavender oil, lemon oil, eucalyptus oil, peppermint oil, *cananga odorata, cupressus sempervirens, curcuma longa, cymbopogon citratus, eucalyptus globulus, pinus radiate, piper crassinervium, psidium guayava, rosmarinus officinalis, zingiber officinale*, thyme, thymol, allyl isothiocyanate (AIT), hinokitiol, carvacrol, eugenol, α-terpinol, sesame oil, or any combination thereof.

Depending upon the application, the volatile antimicrobial agent can be used neat or in combination with other solvents or components. In general, the release of the volatile antimicrobial agent can be varied by the presence of these solvents or components. For example, one or more food safe solvents such as ethanol or sulfur dioxide can be mixed with the volatile antimicrobial agent prior to admixing with the absorbent composition. Alternatively, the volatile antimicrobial agent can be coated with one or more water-soluble materials. Examples of such water-soluble material include cyclodextrin, maltodextrin, corn syrup solid, gum arabic, starch, or any combination thereof. The materials and techniques disclosed in U.S. Published Application No. 2006/0188464 can be used herein to produce the coated volatile antimicrobial agents.

In other aspects, non-volatile antimicrobial agents are used to produce the food preservation composition. The term "non-volatile antimicrobial agent" includes any compound that when it comes into contact with a fluid (e.g., water or the juice from a food product), produces minimal to no vapor of antimicrobial agent. In one aspect, the volatile antimicrobial agent is from 0.5 to 15%, 0.5 to 8%, or 0.5 to 5% by weight of the food preservation composition. Examples of non-volatile antimicrobial agents include, but are not limited to, ascorbic acid, a sorbate salt, sorbic acid, citric acid, a citrate salt, lactic acid, a lactate salt, benzoic acid, a benzoate salt, a bicarbonate salt, a chelating compound, an alum salt, nisin, or any combination thereof. The salts include the sodium, potassium, calcium, or magnesium salts of any of the compounds listed above. Specific examples include calcium sorbate, calcium ascorbate, potassium bisulfite, potassium metabisulfite, potassium sorbate, or sodium sorbate.

Preparation of Food Preservation Compositions

The process for producing the food compositions described herein generally involves admixing the adsorbent composition and the antimicrobial agent. The admixing of ingredients can be performed using techniques known in the art. It is desirable that the mixing technique and duration is sufficient to evenly disperse the antimicrobial agent throughout the absorbent composition. The order of the ingredients that are admixed can vary. Thus, the absorbent composition can be prepared first followed by the addition of the antimicrobial agent. Alternatively, all of the ingredients used to produce the absorbent composition and the antimicrobial agent can be admixed together to produce the food preservation composition. The components can be admixed neat or with a solvent (e.g., water or a binder). In one aspect, the components used to produce the absorbent composition and the antimicrobial agent are admixed in neat form without the need of a solvent or binder. In this aspect, the food preservation composition is a dry powder and not an agglomeration of particles. Here, granules are formed having a relatively uniform size. For example, the granules have a size of about 250 to 600 μm.

Applications of the Preservation Compositions

The food preservation compositions described herein are useful in killing microbes on and/or near a food article as well as inhibiting the growth of microbes on and/or near the food article and extending the shelf life of the food. In general, the food preservation composition is placed in a food storage container that holds the food article. The selection of the food storage container and antimicrobial agent can vary depending upon the type of food article that is to be stored.

With respect to the food storage container, a number of different designs can be used. In one aspect, the food storage container includes a pad, a pouch, a tray, a lid, a cup, a bowl, a tote insert, or any combination thereof. For example, the food preservation compositions described herein can be laminated to form a pad that can be placed on a tray or other article for holding food. Alternatively, the food container can be a sealable pouch, where the food preservation composition is in a series of pockets. The pouches disclosed in U.S. Pat. No. 5,820,955, which are incorporated by reference in their entirety, can be used herein. In another aspect, the food storage container is a tray as described in U.S. Pat. No. 6,152,295.

In this aspect, the food preservation composition is placed in the bottom of the tray. The bottom of the tray can be designed such that it has a plurality of cells for receiving the food preservation composition. A liquid and/or gas membrane or material is placed over the bottom of the tray. The membrane or material is selected such that it can support the food article when placed on the tray but is permeable to a liquid and gas. In other aspects, the food preservation composition can be placed in a lid. The lids and storage cups described in U.S. Pat. No. 6,478,147 can be used herein to hold the food preservation composition.

The food article when placed in the storage container is in proximity to the food preservation composition. The distance between the food preservation composition and the food article can vary. It is desirable that the absorbent composition of the food preservation composition does not contact the food article. In certain aspects, the food preservation compositions described herein are effective in preventing the growth of microbes or killing microbes present in an exudate produced from the food article. The term "exudate" is defined herein as any juice or liquid produced by the food article. For example, the food article is placed in a tray as described above, and the exudate produced from the food article flows through the membrane and comes into contact with the food preservation composition. The food preservation composition absorbs the exudate and kills any microbes present in the exudate. In this aspect, the antimicrobial agent can be a non-volatile antimicrobial agent.

In other aspects, the food preservation composition preserves the surface of the food product. Referring to the example above, the food article is placed in a tray, and the tray is wrapped such that a closed environment is created within the tray. The food preservation composition is composed of a volatile antimicrobial agent. In one aspect, when the exudate comes into contact with the food preservation composition, the volatile antimicrobial agent is released into the atmosphere of the closed tray. The volatile antimicrobial agent passes through the membrane and comes into contact with the surface of the food article. Thus, microbes are killed and/or prevented from growing on the exposed surface of the food article.

Although in the aspect described above a volatile antimicrobial agent can be used, it is also contemplated that the food preservation composition can include a combination of volatile and non-volatile antimicrobial agents. Referring to the example above, when a food article is placed in a tray and sealed, any microbes present in the exudate can be killed as well as any microbes present on the exposed surfaces of the food article.

In certain aspects, the compositions described herein can kill and prevent the growth of microbes up to 90%, up to 95% up to 99%, or up to 99.9% of microbes for extended periods of time. The duration of protection can vary, which can be up to 5 days, 10 days, 20 days, or 30 days. A variety of different food articles can be used herein including, but not limited to, vegetables, fruits, meats, poultry, fish, and the like.

It is understood that any given particular aspect of the disclosed compositions and methods can be easily compared to the specific examples and embodiments disclosed herein, including the non-polysaccharide based reagents discussed in the Examples. By performing such a comparison, the relative efficacy of each particular embodiment can be easily determined. Particularly preferred compositions and methods are disclosed in the Examples herein, and it is understood that these compositions and methods, while not necessarily limiting, can be performed with any of the compositions and methods disclosed herein.

EXAMPLES

The following examples are put forth so as to provide those of ordinary skill in the art with a complete disclosure and description of how the compounds, compositions, and methods described and claimed herein are made and evaluated, and are intended to be purely exemplary and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions. The absorbent material used below is composed of the sodium salt of carboxymethylcellulose, bentonite, and potassium aluminum sulfate.

Example 1

Effect of *origanum*, Basil, and Cinnamaldehyde Oils on Survival of *Salmonella* spp. in Packaged Sliced Tomato at about 11° C.

The effect of *origanum*, basil, and cinnamaldehyde oils on the survival of *Salmonella* sp. in packaged sliced tomato was studied. Five *Salmonella* serotypes were used namely, *S. poona* (cantaloupe associated outbreak), *S. stanley* H 1256 (Alfa Alfa sprout associated outbreak), *S. baildon* (tomato associated outbreak), *S. typhimurium* DT 104 and *S. montevideo* (tomato associated outbreak). Five μl of the cocktail was inoculated on top of three tomato slices in package to have a target inoculum of $5 \times 10^6$ CFU/slice. Then, 12, 35, and 75 μl of each volatile antimicrobial agent were pipetted into the wells of the separate packages. The packages were stored at 11° C. for 9 days. After 8 days of incubation mold was observed on some slices in some packages.

The inoculated tomato slices were analyzed at day 0 and 9. Each slice was mixed with 90 ml 0.1% peptone water and stomached for 1 min. Next, 1 ml of the stomached material was diluted in 9 ml 0.1% peptone and spiral plated on MacCkonkey agar plates. The plates were incubated at 37° C. for 18 hr.

The data was analyzed by the General Linear Method using SAS 9.1. Table 1 shows the average counts of the controls (Day 0), Control (Day 9), and treated samples along with their grouping by LSD method. All results are for Day 9 except for the control. All day 0 counts were the same as the control. The "Controls" include absorbent materials but do not include the volatile antimicrobial agent. The other results include both the volatile antimicrobial agent and absorbent materials.

TABLE 1

*Salmonella* on sliced tomatoes after 9 days of storage at about 11° C. Letter superscripts indicate significant differences.

| Sample | Day 9 (Log CFU/Slice) |
| --- | --- |
| Control (Day 0) | 6.43 ± 0.09 |
| Control (Inoculated and | 6.46 ± 0.17 |

TABLE 1-continued

Salmonella on sliced tomatoes after 9 days of storage at about 11° C.
Letter superscripts indicate significant differences.

| Sample | Day 9 (Log CFU/Slice) |
|---|---|
| no volatile) | |
| Origanum 12 | 6.26 ± 0.03 |
| Origanum 35 | 5.83 ± 0.36 |
| Origanum 75 | 5.91 ± 0.08 |
| Basil 12 | 5.50 ± 0.06 |
| Basil 35 | 6.24 ± 0.13 |
| Basil 75 | 6.12 ± 0.12 |
| Cinnamaldehyde 12 | 5.76 ± 0.34 |
| Cinnamaldehyde 35 | 5.34 ± 0.02 |

In the absence of the volatile antimicrobial agent, *salmonella* population remained constant. *Salmonella* population declined significantly when 35 or 75 PI of *origanum*, 12 VI of basil, or 12 and 35 µl of cinnamaldehyde were added. Cinnamaldehyde is the most potent antimicrobial.

Example 2

Survival of *Salmonellae* on Sliced Tomato Packaged with Volatile Antimicrobials at About 4° C.

The effect of volatile antimicrobials on the survival of *Salmonella* sp. in packaged sliced tomato was determined. The antimicrobials tested were *origanum* oil, basil oil, cyclodextrine cinnamaldehyde, chlorine dioxide as spray and in absorbent, and allyl isothiocyanate in cyclodextrine. The combinations of cinnamaldehyde with chlorine dioxide and allyl isothiocyanate in cyclodextrine with cinnamaldehyde were also tested.

Slices were inoculated with 5 *Salmonella* strains that included *S. poona* (cantaloupe associated outbreak), *S. stanley* H 1256 (Alfafa sprout associated outbreak), *S. baildon* (tomato associated outbreak), *S. typhimurium* DT 104 (multiple antibiotic resistant) and *S. montevideo* (tomato associated outbreak). Ten microliters of the *Salmonella* cocktail was inoculated between two tomato slices at three locations in each package to achieve a target inoculum of 5.5 log CFU/inoculation site. Then, the specified volatile antimicrobials were pipetted into the wells of each package. The inoculated packages were stored at 4±1° C. for 10 days.

Inoculated and uninoculated tomato slices were analyzed at days 0 and 10. Each two slices (from the inoculation site) were mixed with 0.1% peptone water in stomacher bag to bring the total weight to 100 g then stomached for 1 minute and diluted. The diluted samples were plated on MacCkonkey agar plates. The plates were incubated at 37° C. for 18 hr and typical *Salmonella* colonies counted. The results are shown in Tables 2 and 3.

A. Results of the Effect of the Volatile Antimicrobials on *Salmonella* Survival at About 4° C.

*Salmonella* increased in number in the untreated tomatoes stored in control trays during the 10 day storage. This increase was generally less than 0.5 log units, a significant but small amount. All tomatoes in treated trays exhibited significant decreases in *Salmonella* during the 10 day storage. The most effective treatments killed 0.5 to 1.1 log units of *Salmonella* compared to the "0" day control, and resulted in the tomatoes being contaminated with 1 to 1.4 log units fewer viable cells after 10 days of storage, which is a 10-fold decrease.

The most effective volatile antimicrobial treatments were *origanum* 150 µl, basil 75 µl, chlorine dioxide in absorbent, cyclodextrine allyl isothiocyanate (high level), and cyclodextrine/cinnamaldehyde (high level) (Table 2). Of these, the chlorine dioxide absorbent and the cyclodextrine allyl isothiocyanate/cinnamaldehyde were most effective; however, the cyclodextrine allyl isothiocyanate/cinnamaldehyde combination was not significantly more effective than cyclodextrine allyl isothiocyanate by itself. Chlorine dioxide spray had little effect on *Salmonella* survival. Combining cinnamaldehyde 35 µl with chlorine dioxide spray did not enhance the effect of the chlorine dioxide spray. It is possible that chlorine dioxide inactivates volatile organics through oxidation. *Origanum* and basil were both effective at killing *Salmonella* but the amount of *origanum* needed to be twice that of basil to get the same efficacy.

TABLE 2

Survival of *Salmonella* on sliced tomatoes packaged with antimicrobials and stored for 10 days and 4° C.

| Treatment | Log CFU/Slice |
|---|---|
| Control 1 (Day 10) | 5.36 |
| Control 2 (Day 10) | 5.34 |
| Control 2 (Day 0) | 4.95 |
| Control 1 (Day 0) | 4.89 |
| Chlorine Dioxide (Day 0) | 4.88 |
| Origanum 75 (All remaining are Day 10) | 4.79 |
| Basil 12 | 4.63 |
| Cyclodextrine Cinnamaldehyde 35/Chlorine Dioxide | 4.6 |
| Origanum 150 | 4.46 |
| Basil 75 | 4.44 |
| Chlorine Dioxide Absorbent | 4.32 |

Control 1 does not include either absorbent materials or volatile antimicrobials. Control 2 includes absorbent materials but does not include volatile antimicrobials. The other results include both the volatile antimicrobials mentioned and absorbent materials.

TABLE 3

Survival of *Salmonella* on sliced tomatoes packaged with antimicrobials and stored for 10 days and 4° C.

| Treatment | Log CFU/Slice |
|---|---|
| Control 1 (Day 10) | 5.97$^a$ |
| Control 2 (Day 10) | 5.78$^a$ |
| Control 2 (Day 0) | 5.48$^b$ |
| Control 1 (Day 0) | 5.35$^{bc}$ |
| Chlorine Dioxide Spray (Day 0) | 5.27$^{bcd}$ |
| Cyclodextrine/Cinnamaldehyde low (Day 10) | 5.22$^{bcd}$ |
| Chlorine Dioxide Spray (All below are Day 10) | 5.17$^{cde}$ |
| Cyclodextrine Cinnamaldehyde 35/Chlorine Dioxide Spray | 5.06$^{de}$ |
| Cyclodextrine allyl isothiocyanate low | 4.94$^{ef}$ |
| Basil 40 | 4.92$^{ef}$ |
| Cinnamaldehyde 35 | 4.78$^{fg}$ |
| Cinnamaldehyde 75 | 4.67$^{fg}$ |
| Cyclodextrine allyl isothiocyanate high | 4.58$^{gh}$ |
| Cyclodextrine/Cinnamaldehyde high | 4.35$^h$ |

Control 1 does not include either absorbent materials or volatile antimicrobials. Control 2 includes absorbent materials but does not include the volatile antimicrobials. The other results include both the volatile antimicrobial agent and absorbent materials. The pH at day 1 was 4.25 and 4.40 at day 10. In the case of chlorine dioxide, trays were sprayed at 2.54 ml/tray (3 inoculation sites) from 10.6 ml stock/1 Liter water of chlorine dioxide.

B. Results from Tomato Slice Location Data at About 4° C.:

Location of Inoculum in Untreated (no Antimicrobial) Slices

Tomato slices were inoculated with *Salmonella* between slices and placed in trays. Data in Table 4 indicates that a small portion of the inoculum migrated downward to the very bottom portion of the slice. The day 0 data (data is taken the day after inoculation) presented in Table 4 indicates no difference in the location of the inoculum between the Control 1 trays and the Control 2 tray at "0" time. After 10 days of storage, slices still had *Salmonella* distributed throughout; however, the distribution differed between Control 1 trays and Control 2 trays. The *Salmonella* in the Control 2 trays were located primarily at the top most portion of the slice (average of 72% of *Salmonella* on the top skin), whereas the Control 1 trays had high numbers at the bottom of the slice (average of 41% in bottom two portions). The total number of *Salmonella* increased on the slices to a similar extent for both tray types (Table 1).

Location of Inoculum in Treated (Antimicrobial) Tomato Slices

The antimicrobial treatments appear to uniformly inactivate *Salmonella* on the tomato slice. After 10 days, surviving *Salmonella* were primarily found on the top portion of the slice, the same as observed for untreated slices in the Control 2 trays.

TABLE 4

Location of viable *Salmonella* on tomato slices after storage with antimicrobials at about 4° C. (Data presented as % of total survivors).

| Treatment | Portion 1 | Portion 2 | Portion 3 | Portion 4 |
|---|---|---|---|---|
| Control 2 (Day 0) | 46 | 54 | 0 | 0 |
| Control 2 (Day 0) | 42 | 51 | 7.3 | 0 |
| Control 2 (Day 0) | 8.1 | 32 | 30 | 30 |
| Control 2 (Day 0) | 56 | 27 | 10 | 6.0 |
| Control 1 (Day 0) | 66 | 0 | 33 | 1.0 |
| Control 1 (Day 0) | 78 | 19 | 1.3 | 1.6 |
| Control 1 (Day 0) | 87 | 7.9 | 3 | 2.1 |
| Control 1 (Day 0) | 83 | 0 | 17 | |
| Chlorine Dioxide (Day 10) | 70 | 30 | 0 | 0 |
| Chlorine Dioxide (Day 10) | 69 | 25 | 4.0 | 2.0 |
| Chlorine Dioxide (Day 10) | 81 | 14 | 4 | 1 |
| Basil 75 (Day 10) | 93 | 0 | 7 | 0 |
| Basil 75 (Day 10) | 78 | 9 | 10 | 3 |
| Basil 75 (Day 10) | 84 | 14 | 1.0 | 1.1 |
| Control 2 (Day 10) | 93 | 7 | | |
| Control 2 (Day 10) | 43 | 26 | 31 | 0 |
| Control 2 (Day 10) | 98 | 1.6 | 0 | 0.4 |
| Control 1 (Day 10) | 18 | 82 | 0 | 0 |
| Control 1 (Day 10) | 22 | 11 | 30 | 37 |
| Control 1 (Day 10) | 26 | 29 | 0 | 45 |

Portion 1: Top portion of skin
Portion 2: Top portion of pulp
Portion 3: Middle portion (skin and pulp)
Portion 4: Bottom ¼ of slice (skin and pulp)

Control 1 does not include either absorbent materials or antimicrobial. Control 2 includes absorbent materials but does not include antimicrobial. The other results include both the anti-microbial mentioned and absorbent materials.

TABLE 5

Location of viable *Salmonella* on tomato slices after storage with antimicrobials at about 4° C. (Data presented as % of total survivors)

| Treatment | Portion 1 | Portion 2 | Portion 3 | Portion 4 |
|---|---|---|---|---|
| Control 2 (Day 0) | 58 | 22 | 17 | 4 |
| Control 2 (ay 0) | 93 | 3 | 1 | 3 |
| Control 2 (Day 0) | 69 | 19 | 9 | 3 |
| Control 2 (Day 0) | 43 | 20 | 34 | 3 |
| Control 2 (Day 0) | 78 | 14 | 6 | 2 |
| Control 2 (Day 0) | 70 | 25 | 2 | 2 |
| Control 1 (Day 0) | 40 | 54 | 0.3 | 6 |
| Control 1 (Day 0) | 67 | 24 | 6 | 2 |
| Control 1 (Day 0) | 65 | 2 | 21 | 12 |
| Control 1 (Day 0) | 95 | 4 | 0.2 | 0.2 |
| Control 1 (Day 0) | 85 | 15 | 0.1 | 0 |
| Control 1 (Day 0) | 47 | 28 | 25 | 1 |
| Chlorine Dioxide Spray (Day 0) | 56 | 40 | 3 | 1 |
| Chlorine Dioxide Spray (Day 0) | 55 | 35 | 9 | 1 |
| Chlorine Dioxide Spray (Day 0) | 79 | 19 | 2 | 0 |
| Cinnamaldehyde 75 (Day 10) | 75 | 24 | 0 | 0 |
| Cinnamaldehyde 75 (Day 10) | 73 | 25 | 2 | 0.5 |
| Cinnamaldehyde 75 (Day 10) | 87 | 12 | 1 | 0 |
| Cinnamaldehyde 75 (Day 10) | 91 | 3 | 6 | 0.5 |
| Cyclodextrine/Cinnamaldehyde high (Day 10) | 77 | 4 | 9 | 11 |
| Cyclodextrine/Cinnamaldehyde high (Day 10) | 76 | 23 | 0 | 0.6 |
| Cyclodextrine allyl isothiocyanate high (Day 10) | 87 | 9 | 3 | 0.4 |
| Cyclodextrine allyl Isothiocyanate high (Day 10) | 39 | 41 | 12 | 8 |
| Cyclodextrine allyl Isothiocyanate high (Day 10) | 74 | 20 | 6 | 0 |
| Control 2 (Day 10) | 62 | 16 | 7 | 14 |
| Control 2 (Day 10) | 71 | 20 | 6 | 3 |
| Control 2 (Day 10) | 64 | 18 | 16 | 3 |
| Control 1 (Day 10) | 17 | 14 | 33 | 36 |
| Control 1 (Day 10) | 61 | 21 | 17 | 19 |
| Control 1 (Day 10) | 36 | 31 | 15 | 17 |

Control 1 does not include either absorbent materials or volatile antimicrobials. Control 2 includes absorbent materials but does not include volatile antimicrobials. The other results include both the volatile antimicrobial and absorbent materials.

C. Analysis of Absorbent in Trays After Storage of the Tomatoes at About 4° C.

The absorbent in the trays was analyzed for aerobic plate count and *salmonella* levels at the conclusion of the study. The data was obtained on day 11.

Absorbent from Untreated (no Antimicrobials) Controls

Growth of spoilage microflora was inhibited in the absorbent in Control 2 as compared to the drip in Control 1 trays. The difference was 1.8 (Table 7) and 2.2 log (Table 6) values of aerobic plate count (APC). *Salmonella* levels were approximately the same in both tray types (Tables 8 and 9). This reflects the normally slow of growth of *Salmonella* in the juice at 4° C. The absorbent material in Control 2 inhibits growth but does not kill the *Salmonella*.

Absorbent from Treated (Antimicrobials) Trays

Chlorine dioxide in the absorbent did not produce much additional growth inhibition, but when combined with cinnamaldehyde, growth was greatly reduced (Table 7). The cinnamaldehyde (Table 6) by itself causes little growth inhibition. Treatments that produce increased growth inhibition (decreased APC) over the control absorbent include: basil 75 µl, *origanum* 75 µl and 100 µl, cinnamaldehyde/chlorine dioxide absorbent, chlorine dioxide spray, cinnamaldehyde 35 μl/chlorine dioxide spray, cyclodextrine allyl isothiocyanate low and high. The most effective treatments for reducing APC were cinnamaldehyde/chlorine dioxide in absorbent and allyl isothiocyanate in cyclodextrine.

Treatments that effectively killed the *Salmonella* in the absorbent included *origanum* 75 μl and 150 μl, cinnamaldehyde/chlorine dioxide in absorbent, basil 40 μl, cinnamaldehyde/chlorine dioxide in spray, and allyl isothiocyanate in cyclodextrine. Treatments that effectively killed *Salmonella* also prevented growth of aerobic microflora.

TABLE 6

Aerobic Plate Count of the absorbent in trays after 11 days of storage at 4° C.

| Sample | Log CFU/ml |
|---|---|
| Control 1 | 7.00 |
| Control 2 | 4.80 |
| Chlorine Dioxide | 4.63 |
| Basil 12 | 4.55 |
| Basil 75 | 3.38 |
| Origanum 150 | 2.90 |
| Origanum 75 | 2.24 |
| Cinnamaldehyde 35/Chlorine Dioxide | <1.7 |

Control 1 does not include either absorbent materials or volatile antimicrobials. Control 2 includes absorbent materials but does not include volatile antimicrobials. The other results include both the volatile antimicrobial mentioned and absorbent materials.

TABLE 7

Aerobic Plate Count of the absorbent in trays after 11 days of storage at about 4° C.

| Sample | CFU/ml |
|---|---|
| Control 1 | 7.54 |
| Control 2 | 5.68 |
| Cyclodextrine allyl isothiocyanate high | 5.53 |
| Cinnamaldehyde 75 | 5.40 |
| Basil 40 | 4.69 |
| Cinnamaldehyde 35 | 4.62 |
| Chlorine Dioxide Spray | 3.23 |
| Cinnamaldehyde 35/Chlorine Dioxide Spray | 3.02 |
| Cyclodextrine allyl isothiocyanate low | <1.7[a] |
| Cyclodextrine Cinnamaldehyde High | <1.7[a] |

[a]<1.7 Log CFU/ml indicates none detected.

Control 1 does not include either absorbent materials or volatile antimicrobials. Control 2 includes absorbent materials but does not include volatile antimicrobials. The other results include both the volatile antimicrobial mentioned and absorbent materials.

TABLE 8

*Salmonella* in the absorbent in trays after 11 days of storage at about 4° C.

| Sample | Log CFU/ml |
|---|---|
| Control 1 | 3.65 |
| Control 2 | 3.94 |
| Chlorine Dioxide | 1.40 |
| Basil 12 | 3.07 |
| Basil 75 | 2.26 |
| Origanum 150 | <0.7 |
| Origanum 75 | 1.0 |
| Cinnamaldehyde 35/Chlorine Dioxide | <0.7 |

Control 1 does not include either absorbent materials or volatile antimicrobials. Control 2 includes absorbent materials but does not include volatile antimicrobials. The other results include both the volatile antimicrobial and absorbent materials.

TABLE 9

*Salmonella* in the absorbent in trays after 11 days of storage at about 4° C.

| Sample | Log CFU/ml |
|---|---|
| Control 1 | 3.9 |
| Control 2 | 3.04 |
| Cyclodextrine allyl isothiocyanate high | 0.7 |
| Cinnamaldehyde 75 | 2.04 |
| Basil 40 | <1.7 |
| Cinnamaldehyde 35 | 2.83 |
| Chlorine Dioxide Spray | 2.21 |
| Cinnamaldehyde 35/Chlorine Dioxide Spray | <0.7 |
| Cyclodextrine allyl isothiocyanate low | <0.7 |
| Cyclodextrine Cinnamaldehyde High | <0.7 |

Control 1 does not include either absorbent materials or volatile antimicrobials. Control 2 includes absorbent materials but does not include volatile antimicrobials. The other results include both the volatile antimicrobial mentioned and absorbent materials.

Example 3

Survival of *Salmonella* on Sliced Tomato Packaged with Volatile Antimicrobials at About 4° C.

The effect of low levels of specified antimicrobials on survival of *Salmonella* sp. in packaged sliced tomato under refrigeration (4±1° C.) was determined. The volatile antimicrobials tested were chlorine dioxide, allyl isothiocyanate cyclodextrine, *origanum* cyclodextrine, cinnamaldehyde cyclodextrine and basil cyclodextrine. The antimicrobials were added to control trays as shown in Table 10.

TABLE 10

Antimicrobials used and amounts used

| Antimicrobial | Antimicrobial amount per tray (in grams for chlorine dioxide and μl for others) | | | | |
|---|---|---|---|---|---|
| Chlorine Dioxide | 0.4 | 0.25 | 0.112 | 0.052 | 0.024 |
| AIT Cyclodextrine | 36 | 16 | 4 | 2 | NT* |
| Origanum Cyclodextrine | 36 | 20 | 7 | 3.5 | NT |

TABLE 10-continued Antimicrobials used and amounts used

| Antimicrobial | Antimicrobial amount per tray (in grams for chlorine dioxide and μl for others) | | | | |
|---|---|---|---|---|---|
| Cinnamaldehyde Cyclodextrine | 36 | 20 | 7 | 3.5 | NT |
| Basil Cyclodextrine | 12 | 10 | 6 | 3 | NT |

*NT: No Treatment

Slices were inoculated with 5 *Salmonella* strains that included *S. poona* (cantaloupe associated outbreak), *S. stanley* H 1256 (Alfafa sprout associated outbreak), *S. baildon* (tomato associated outbreak), *S. typhimurium* DT 104 (multiple antibiotic resistant) and *S. montevideo* (tomato associated outbreak). Ten microliters of the *Salmonella* cocktail was inoculated between two tomato slices at three locations in each package to achieve a target inoculum of 5.5 log CFU/ inoculation site. The inoculated packages were stored at 4±1° C. for 10 days.

Inoculated and uninoculated tomato slices were analyzed at 0, 5 and 10 days. Inoculated slices were mixed with 0.1% peptone water in stomacher bag to bring the total weight to 100 g, stomached for 1 min, then appropriate dilutions were plated on MacCkonkey agar plates. The plates were incubated at 37° C. for 18 hr and typical *Salmonella* colonies counted. The absorbent (fluid in case of Control 1 trays) was analyzed for *Salmonella* and Aerobic Plate Count by plating appropriate dilution of the gel/fluid on MacConkey agar plates and Plate Count Agar.

The results are summarized in Tables 11 and 12 and FIGS. 1-5. The Control 2 trays had significantly fewer *Salmonella* than the Control 1 trays after five days of storage (log 6.24 for Control 1 vs. log 5.72 for Control 2). None of the antimicrobial treatments was more effective than the Control 2 in reducing *Salmonella* after the five days of storage (see Table 11). Essentially, the antimicrobial treatments act in the later part of the storage, which may be due to lack of upfront release because of lack of drip.

TABLE 11

Survival of *Salmonella* on sliced tomatoes packaged with antimicrobials and stored for 5 days at about 4° C.

| Treatment | Log CFU/g |
|---|---|
| Chlorine dioxide 0.024 | 6.32 |
| Control 1 (Day 5) | 6.24 |
| Basil cyclodextrine 6 | 6.11 |
| Origanum cyclodextrine 36 | 6.03 |
| Ally isothiocyanate cyclodextrine 16 | 6.01 |
| Basil cyclodextrine 10 | 5.99 |
| Origanum cyclodextrine 7 | 5.97 |
| Chlorine dioxide 0.4 | 5.96 |
| Control 1 (Day 0) | 5.94 |
| Cinnamaldehyde cyclodextrine 7 | 5.90 |
| Chlorine dioxide 0.112 | 5.90 |
| Ally isothiocyanate cyclodextrine 4 | 5.88 |
| Origanum cyclodextrine 7 | 5.86 |
| Control 2 (Day 0) | 5.84 |
| Origanum cyclodextrine 3.5 | 5.84 |
| Basil cyclodextrine 3 | 5.84 |
| Ally isothiocyanate cyclodextrine 36 | 5.78 |
| Control 2 (Day 5) | 5.72 |
| Ally isothiocyanate cyclodextrine 2 | 5.70 |
| Basil cyclodextrine 12 | 5.68 |
| Chlorine dioxide 0.25 | 5.65 |
| Cinnamaldehyde cyclodextrine 3.5 | 5.65 |
| Chlorine dioxide 0.052 | 5.61 |
| Cinnamaldehyde cyclodextrine 20 | 5.47 |
| Cinnamaldehyde cyclodextrine 35 | 5.42 |

Control 1 does not include either absorbent materials or volatile antimicrobials. Control 2 includes absorbent materials but does not include volatile antimicrobials. The other results include both the volatile antimicrobial mentioned and absorbent materials.

After 10 days of storage, the Control 2 trays (no volatile antimicrobial added) continued to produce lower *Salmonella* levels than the Control 1 trays (6.45 log vs. 6.00 log). The difference between the two counts is similar to that observed after 5 days, indicating that most of the benefit of the Control 2 tray (without added antimicrobial) is realized in the first 5 days (see Table 12). However, it is noted that there was significant growth of *Salmonella* in the Control 1 tomatoes during the 10 day storage (an increase of 0.5 log units), whereas the increase in *Salmonella* in the Control 2 tomatoes (an increase of 0.16 log units) was not statistically significant (Table 12).

Antimicrobial effectiveness after 10 days. Chlorine dioxide, allyl isothiocyanate, and cinnamaldehyde were the most effective antimicrobials tested and were able to significantly reduce the amount of *Salmonella* on the tomatoes by 0.8-0.85 log units compared to Control 2 tomatoes with no volatile antimicrobial, and 1.3 to 1.35 log units compared to Control 1 tomatoes. There were no significant differences in the effectiveness of chlorine dioxide at levels of 0.112, 0.25 and 0.4, although increasing the amount in the tray reduced the amount of *Salmonella*. Increasing the concentration of AITC from 16 to 36 resulted in significant reductions of *Salmonella*. AITC at levels 2 and 4 was not effective. Addition of basil produced modest but significant decreases in *Salmonella* but the effect was not dose dependent.

TABLE 12

Survival of *Salmonella* on sliced tomatoes packaged with antimicrobials and stored for 10 days at 4° C.

| Treatment | Log CFU/g |
|---|---|
| Control 1 (Day 10) | 6.45 |
| Control 2 (Day 10) | 6.00 |
| Origanum cyclodextrine 3.5 | 5.99 |
| Control 1 (Day 0) | 5.94 |
| Ally isothiocyanate cyclodextrine 4 | 5.94 |
| Chlorine dioxide 0.024 | 5.89 |
| Basil cyclodextrine 3 | 5.86 |
| Control 2 (Day 0) | 5.84 |
| Ally isothiocyanate cyclodextrine 2 | 5.84 |
| Origanum cyclodextrine 7 | 5.83 |
| Origanum cyclodextrine 36 | 5.72 |
| Ally isothiocyanate cyclodextrine 16 | 5.68 |
| Cinnamaldehyde cyclodextrine 3.5 | 5.67 |
| Chlorine dioxide 0.052 | 5.65 |
| Cinnamaldehyde cyclodextrine 7 | 5.63 |
| Basil cyclodextrine 12 | 5.57 |
| Basil cyclodextrine 6 | 5.57 |
| Basil cyclodextrine 10 | 5.54 |
| Cinnamaldehyde cyclodextrine 20 | 5.46 |
| Chlorine dioxide 0.112 | 5.42 |
| Chlorine dioxide 0.25 | 5.32 |
| Ally isothiocyanate cyclodextrine 36 | 5.20 |
| Chlorine dioxide 0.4 | 5.15 |
| Cinnamaldehyde cyclodextrine 35 | 5.15 |

Control 1 does not include either absorbent materials or volatile antimicrobials. Control 2 includes absorbent materials but does not include volatile antimicrobials. The other results include both the volatile antimicrobial mentioned and absorbent materials.

Aerobic Plate Counts and *Salmonella* in the Absorbent.

AITC 36 was most effective at killing *Salmonella* that dripped into the absorbent, although chlorine dioxide also reduced the pathogen numbers. The volatile antimicrobials also prevent aerobic microbial growth in the absorbent, except when used at the lowest levels (see Table 13).

TABLE 13

Aerobic plate count and *Salmonella* counts in the absorbent/juice taken from trays after 10 days of storage at about 4° C.

| Treatment | Aerobic Plate Count (Log CFU/g) | *Salmonella* (Log CFU/g) |
| --- | --- | --- |
| Control 2 | 4.72 | 4.55 |
| Control 1 | 6.08 | 4.35 |
| Chlorine Dioxide 0.4 | <2.3 | 3.77 |
| Chlorine Dioxide 0.25 | <2.3 | NA* |
| Chlorine Dioxide 0.112 | 5.1 | 4.43 |
| Chlorine Dioxide 0.052 | 4.62 | 4.39 |
| Chlorine Dioxide 0.024 | <2.3 | 3.26 |
| Allyl Isothiocyanate cyclodextrine 36 | <2.3 | 2.3 |
| Allyl Isothiocyanate cyclodextrine 16 | 2.48 | 3.23 |
| Allyl Isothiocyanate cyclodextrine 4 | 3.88 | 3.50 |
| Allyl Isothiocyanate cyclodextrine 2 | 4.42 | 3.76 |
| Origanum Cyclodextrine 36 | 3.2 | 4.76 |
| Origanum Cyclodextrine 20 | NA | NA |
| Origanum Cyclodextrine 7 | NA | 4.78 |
| Origanum Cyclodextrine 3.5 | 5.72 | 4.75 |
| Cinnamaldehyde Cyclodextrine 36 | 3.23 | 4.50 |
| Cinnamaldehyde Cyclodextrine 20 | 4.15 | 4.76 |
| Cinnamaldehyde Cyclodextrine 7 | 5.75 | 4.79 |
| Cinnamaldehyde Cyclodextrine 3.5 | 5.25 | 4.50 |
| Basil Cyclodextrine 12 | 5.56 | 4.40 |
| Basil Cyclodextrine 10 | 5.06 | 4.62 |
| Basil Cyclodextrine 6 | >7 | 5 |
| Basil Cyclodextrine 3 | >7 | 5.04 |

NA: Non countable due to microbial overgrowth of the plate.

Control 1 does not include either absorbent materials or volatile antimicrobials. Control 2 includes absorbent materials but does not include volatile antimicrobials. The other results include both the volatile antimicrobial mentioned and absorbent materials.

In summary, trays with absorbent materials and the volatile antimicrobials chlorine dioxide, cyclodextrine AITC, or cyclodextrine cinnamaldehyde added to absorbent significantly reduced levels of *Salmonella* present on tomato slices at the time of packaging. The antimicrobial effect of these substances was most apparent between 5 and 10 days after packaging when storage is at 4° C. The Control 2 tray technology without the volatile antimicrobial effectively reduces the *Salmonella* population on tomato slices during the first 5 days of storage at 4° C. when compared to tomatoes in the Control 1 trays.

Example 4

Behavior of Bacterial Count and Yeast and Mold Counts in Absorbent Materials Containing Antimicrobial (Nonvolatile) Compounds and Tomato Juice at About 4° C.

The effectiveness of citric acid and potassium sorbate in combination and individually on the spoilage of tomato juice in gel was evaluated by monitoring the changes on total bacterial count, yeast and mold count. The trays contained citric acid and potassium sorbate at different levels together with absorbent materials. The amounts of citric acid were 0.1, 0.075, 0.05, and 0.025 g, which correspond to C100, C75, C50, and C25, respectively, in FIGS. 6-13. The amounts of potassium sorbate were 0.04, 0.03, 0.02, and 0.01 g, which correspond to S100, S75, S50, and S25, respectively, in FIGS. 6-13.

Samples were analyzed on days 5, 7, and 10. Total bacterial count was spiral plated on Plate Count Agar (PCA) which incubated at 37° C. for 24 h, while yeast and mold were spread plated on Dichloran Rose Bengal Chloramphenicol (DRBC), which was incubated at 25° C. for 5 days.

Untreated gels with tomato juice supported microbial growth and would be considered "spoiled" after 5 to 7 days. None of the treated gels supported significant growth of either yeast, mold, and bacteria when compared to the control. Bacterial levels decreased for all treated gels. Yeast and mold counts decreased during the first 5 days and then slowly increased. Addition of citric acid had little effect on yeast and mold growth. FIGS. 6-13 show the results of the experiments. Potassium sorbate was adequate to preserve the gel over a 10 day period with a 4° C. storage temperature. Addition of sorbate kills bacteria in the juice and allows little growth of yeast and mold.

Example 5

Behavior of *Salmonella*, *Escherichia coli* O157:H7 and *Listeria Monocytogenes* in Absorbent Materials Containing Antimicrobial Compounds and Tomato Juice at 4° C.

The effect of citric acid and potassium sorbate individually and in combination on the growth and survival of *Salmonella*, *Escherichia coli* O157:H7 and *Listeria monocytogenes* in Fresh-r-Pax absorbent containing pasteurized tomato juice was determined. In addition, the spoilage of unpasteurized tomato juice in gel was monitored by determining changes in aerobic microflora. The trays contained citric acid and potassium sorbate at different levels together with absorbent materials. To study the effect on pathogens, five treatments were investigated namely, potassium sorbate 0.04 and 0.03 g (S100, S75), citric acid 0.1 g (C100), two combinations C65/S75 and C50/S50. Sorbate 75, Citric acid 100, and Citric 75/Sorbate 75 were used to study the effect on spoilage (aerobic plate count). All treatments were replicated twice.

Samples were analyzed on days 5, 7, and 10 by plating appropriate dilutions. *Salmonella* was determined using MacConkey agar, *E. coli* O157:H7 using MacConkey Sorbitol Agar, *Listeria monocytogenes* using *Listeria* Selective Agar, and aerobic microflora using Plate Count Agar.

The results are shown in FIGS. 14-17. Control 1 does not include either absorbent materials or antimicrobials. Control 2 includes absorbent materials but does not include antimicrobials. The other results include both the anti-microbial mentioned and absorbent materials.

Absorbent Materials with no Antimicrobials

Growth of pathogens in tomato juice is controlled by the combination of low pH and cold temperature; however, these conditions do not cause death and appear to allow a low amount of growth. The aerobic microflora in the juice increased dramatically over the 10 day storage, indicating that the microflora is more acid and tolerant of the cold than the pathogens.

Sorbate as an Antimicrobial

Sorbate in the absorbent inactivated *Salmonella* by 1.5 logs, *Escherichia coli* O157:H7 by 1.5 logs, and *Listeria monocytogenes* by 1 log. Increasing the level had no significant effect on pathogen inactivation. Addition of sorbate effectively inhibited growth of the aerobic microflora.

Citric Acid as an Antimicrobial

Citric acid in the adsorbent inactivated *Salmonella* by 1.1 logs, *Escherichia coli* O157:H7 by 1.5 logs, and *L. monocytogenes* by 1 log. Therefore citric acid was less effective than sorbate against *Salmonella* but equally effective against the other pathogens. Citric acid was equally effective as sorbate at reducing growth of aerobic spoilage microflora.

Sorbate/Citrate Combination as an Antimicrobial

The 75/75 combination of sorbate and citric acid was significantly more effective at inactivating *Salmonella* than either antimicrobial used alone, but this additional effectiveness was only apparent after 10 days, not after 7 days of storage. The combination of antimicrobials was not more effective against the other pathogens and the aerobic microflora.

In summary, sorbate and citric acid added to absorbent inactivated the pathogens most commonly associated with fresh tomatoes. These antimicrobials also prevent growth of spoilage microflora in the absorbent.

Example 6

Behavior of *Salmonella, Escherichia coli* O157:H7 and *Listeria monocytogenes* in Absorbent Materials Containing Antimicrobial (Nonvolatile) Compounds and Tomato Juice at 4° C.

The effect of potassium sorbate individually on the survival of *Salmonella, Escherichia coli* O157:H7 and *Listeria monocytogenes* in absorbent materials containing pasteurized tomato juice was determined. Additionally, the spoilage of unpasteurized tomato juice in gel was monitored by determining changes in aerobic microflora. The trays contained potassium sorbate at different levels together with absorbent materials. To study the effect on pathogens, five treatments were investigated namely, potassium sorbate 0.03, 0.02, 0.01, 0.005, 0.0025 g (S75, S50, S25, S10, and S5, respectively). All treatments were replicated twice.

Samples were analyzed on days 5, 7, and 10 by plating appropriate dilutions. *Salmonella* was determined using MacConkey agar, *E. coli* O157:H7 using MacConkey Sorbitol Agar, *Listeria monocytogenes* using *Listeria* Selective Agar, and aerobic microflora using Plate Count Agar and yeast/mold count using DRBC agar. The results are shown in FIGS. 18-21.

In summary, the unpasteurized juice was highly contaminated with yeast, so yeast/mold data could not be obtained (colonies too count numerous on the plates). The lowest level of sorbate (0.0025 g) was effective at inhibiting growth of pathogenic and aerobic microorganisms in the gel/tomato juice mixture. Higher levels of potassium sorbate were marginally more effective than lower levels of sorbate.

Example 7

Behavior of *Salmonella, Escherichia coli* O157:H7 and *Listeria monocytogenes* in Sliced Packaged Tomatoes Methods Pathogens were prepared for inoculation as individual strain mixtures (cocktails) of *Salmonella, E. coli* O157:H7 and *Listeria monocytogenes*. Each pathogen cocktail included three different strains of the pathogen present in roughly equal amounts.

Tomatoes were sliced and packed into trays manufactured by Maxwell Chase with absorbent and potassium sorbate (MCT-2) and ribbed bottom trays with no absorbent (RBT). Ten microliters of the each microbial (pathogen) cocktail was inoculated between two tomato slices at three locations in each tray to achieve a target inoculum of 100,000 (5 log) colony forming units (CFU) per inoculation site. The trays were then sealed and stored at 4° C. for 11 days. The initial inoculum (Day 0) was obtained by plate count of the pathogen cocktails. Tomatoes were sampled for analysis after 1, 6, and 11 days of storage.

To determine the number (colony forming units) of each pathogen in the inoculated tomatoes, two slices (from the inoculation site) were weighed, mixed with 0.1% peptone water in sterile stomacher bag to bring the total weight to 100 g and bag was stomached for 1 min. Appropriate dilutions were spiral plated on MacConkey Agar for *Salmonella* analysis, on Sorbitol MacConkey Agar for *E. coli* O157:H7 analysis and on *Listeria* Selective Agar for *L. monocytogenes* analysis. The plates were incubated at 35° C. for 18 hrs and then typical colonies counted. The absorbent from the MCT-2 trays and the juice from the Ribbed Bottom trays were also analyzed for pathogen content at days 6 and 11. These were weighed and diluted as appropriate and plated on the appropriate media for pathogen determination.

Two trays were examined at each time, with three samples per tray. Results are reported as the average of the 6 analyses.

Pathogens on Tomato Slices

Figure 22:
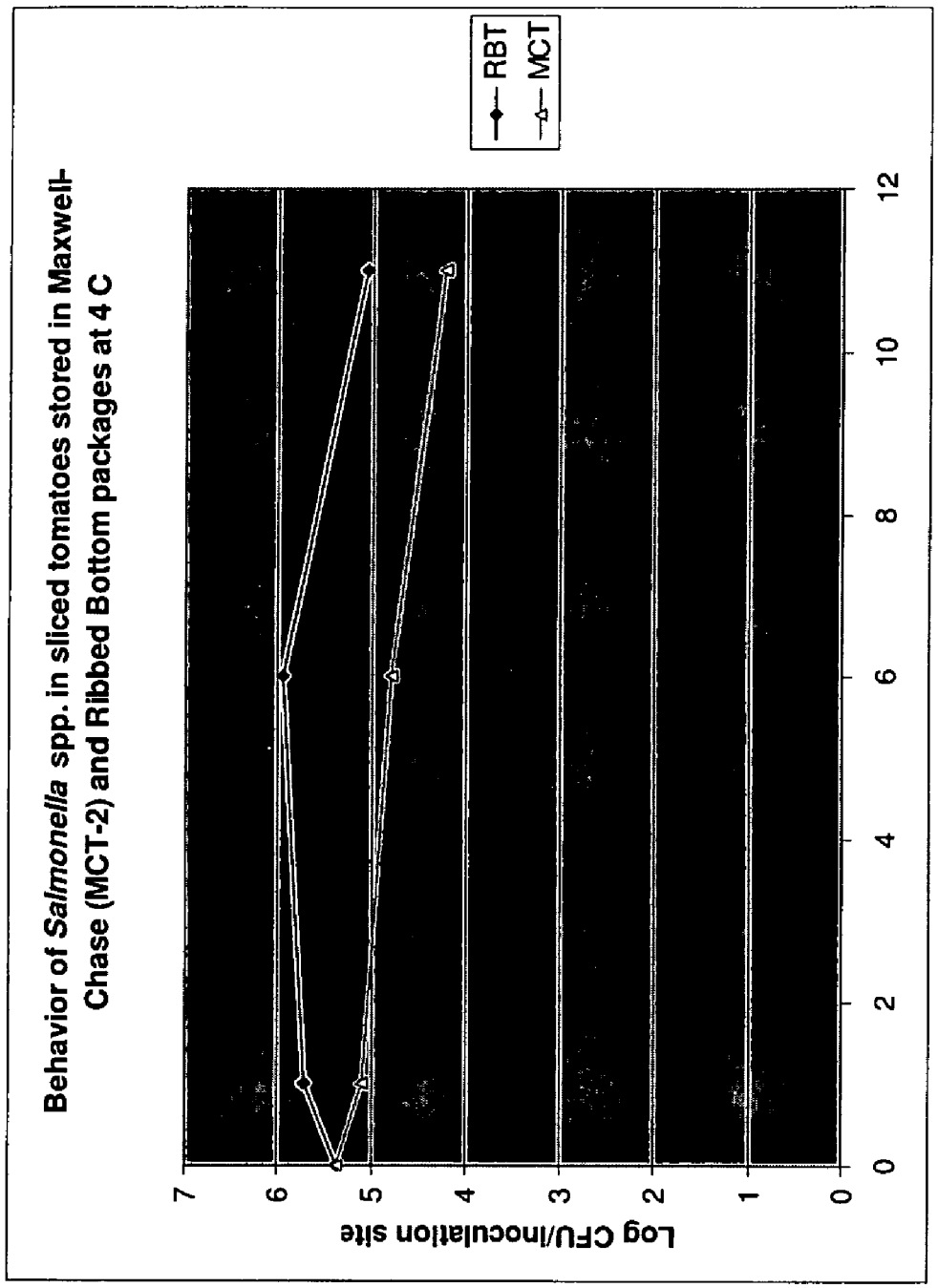
FIG. 22 shows the behavior of *Salmonella* spp. in sliced tomatoes stored in MCT-2 and ribbed bottom trays (RBT) at 4° C.

*Salmonella* on tomatoes packaged in ribbed bottom trays increased in number during the first 6 days of storage and then decreased in number to day 11, whereas *Salmonella* in tomatoes packaged in trays with absorbent and potassium sorbate gradually decreased in number throughout the storage period (FIG. 22). The net result is that after 6 and 11 days of storage there was approximately 10-fold more *Salmonella* on tomatoes in the ribbed bottom trays than on tomatoes packaged in the MCT-2 trays. This difference is considered significant.

Figure 23:
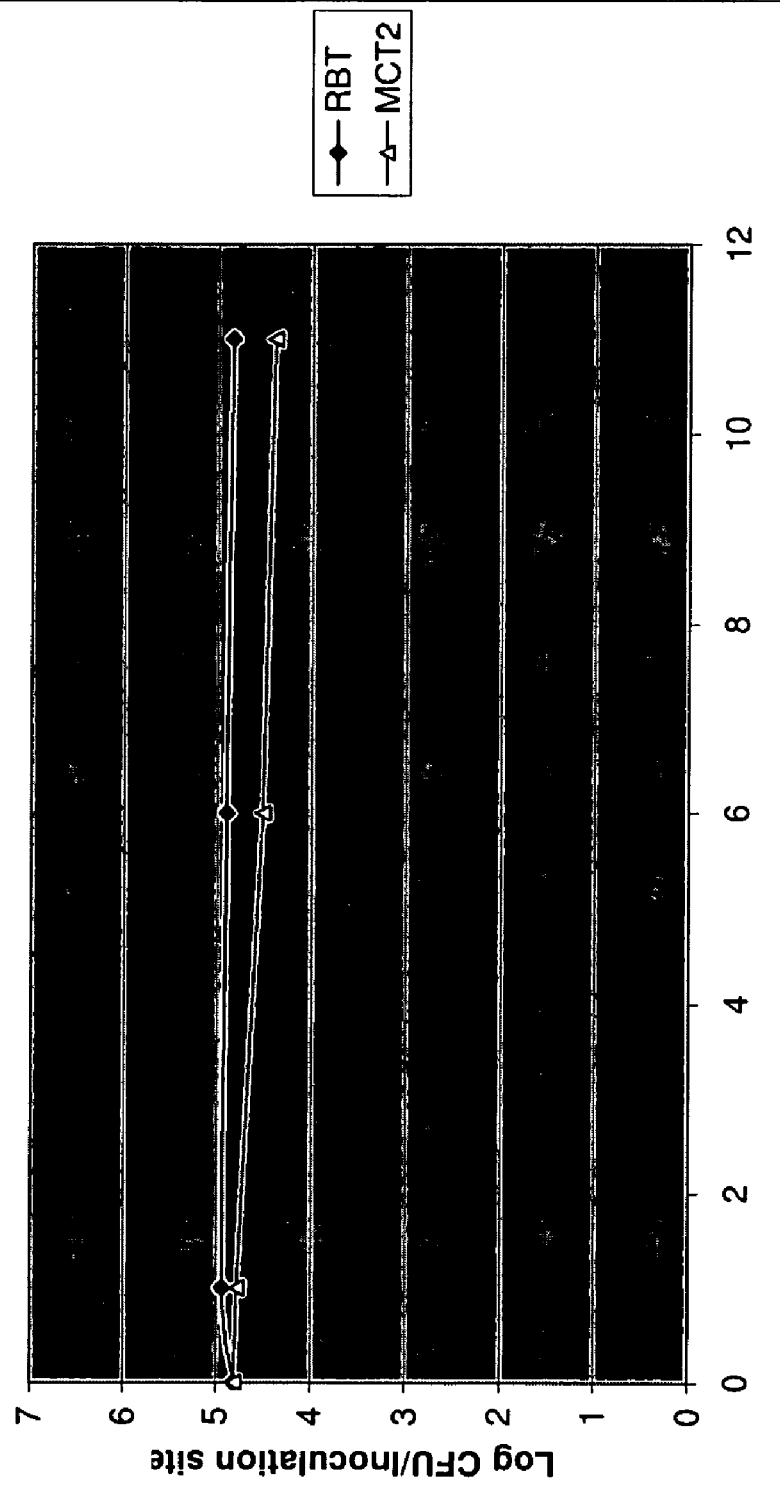
FIG. 23 shows the behavior of *E. coli* O157:H7 in sliced tomatoes stored in MCT-2 and ribbed bottom trays (RBT) at 4° C.

Numbers of *E. coli* O157:H7 on tomatoes packaged in ribbed bottom trays remained constant throughout the 11 day storage, whereas there was slight decline in the numbers of this pathogen on tomatoes stored in MCT-2 trays (FIG. 23). The net result was an approximate 0.4 log decrease in *E. coli* on tomatoes in MCT-2 trays as compared to the ribbed bottom alternative. This decrease is considered marginally significant.

Figure 24:
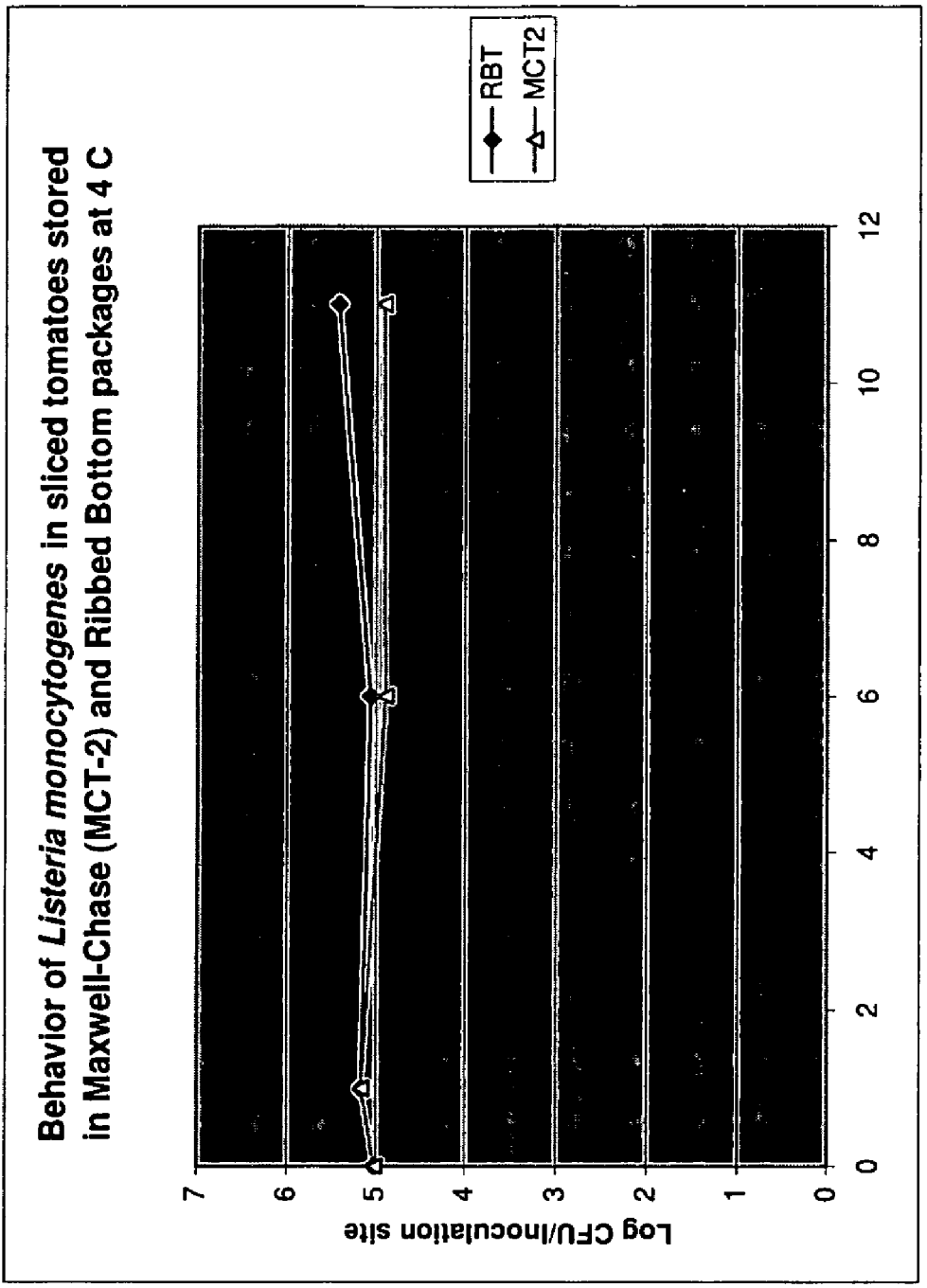
FIG. 24 shows the behavior of *Listeria monocytogenes* in sliced tomatoes stored in MCT-2 and ribbed bottom trays (RBT) at 4° C.

Numbers of *L. monocytogenes* on tomatoes in both package types remained relatively constant throughout storage. However, numbers of this pathogen on tomatoes in the MCT-2 trays were marginally lower than on tomatoes in the ribbed bottom trays after 11 days of storage (FIG. 24).

Pathogens in the Absorbent and Drip.

Figure 25:
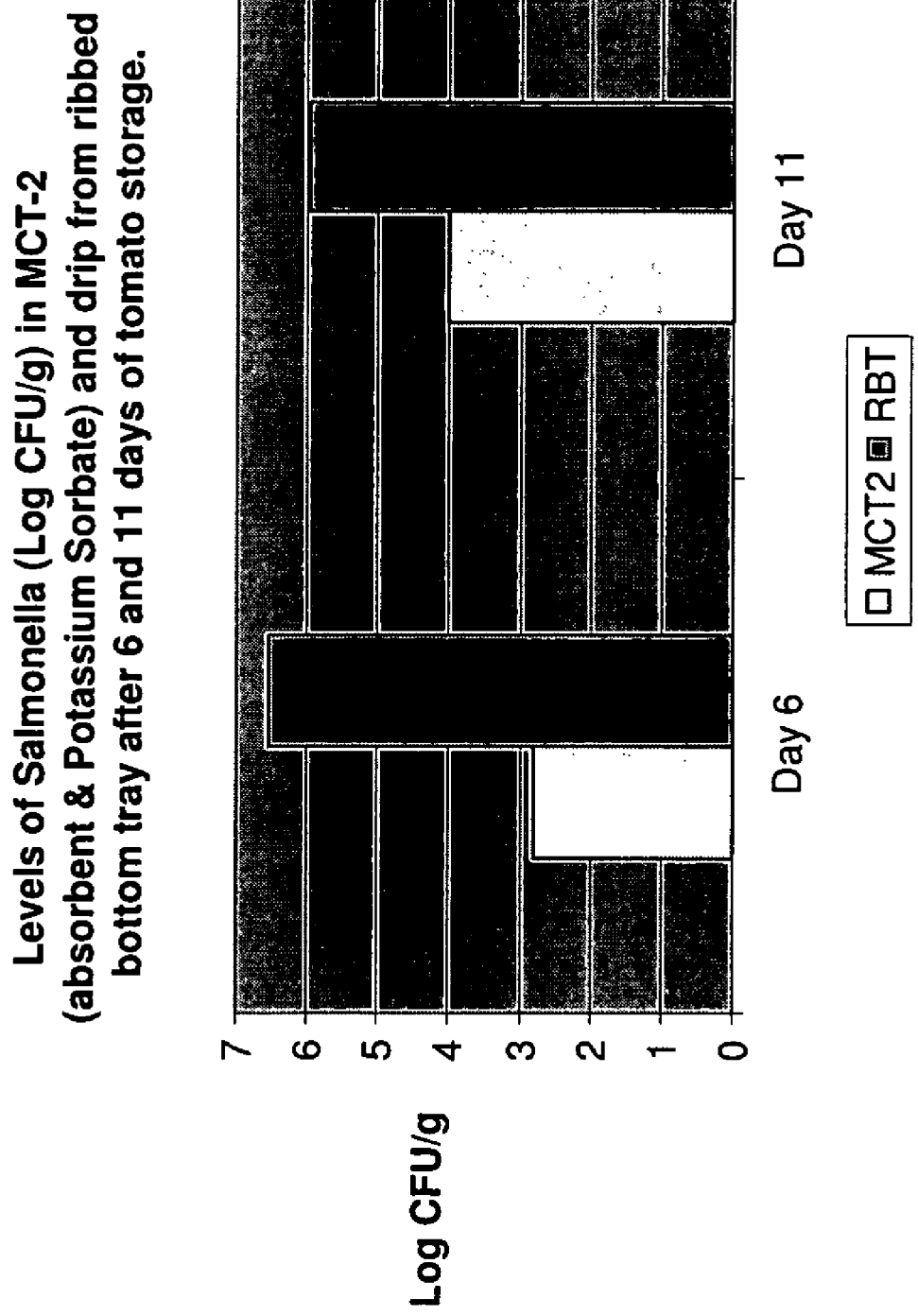
FIG. 25 shows the levels of *Salmonella* (Log CFU/g) in MCT-2 and drip from ribbed bottom tray after 6 and 11 days of tomato storage.
Figure 26:
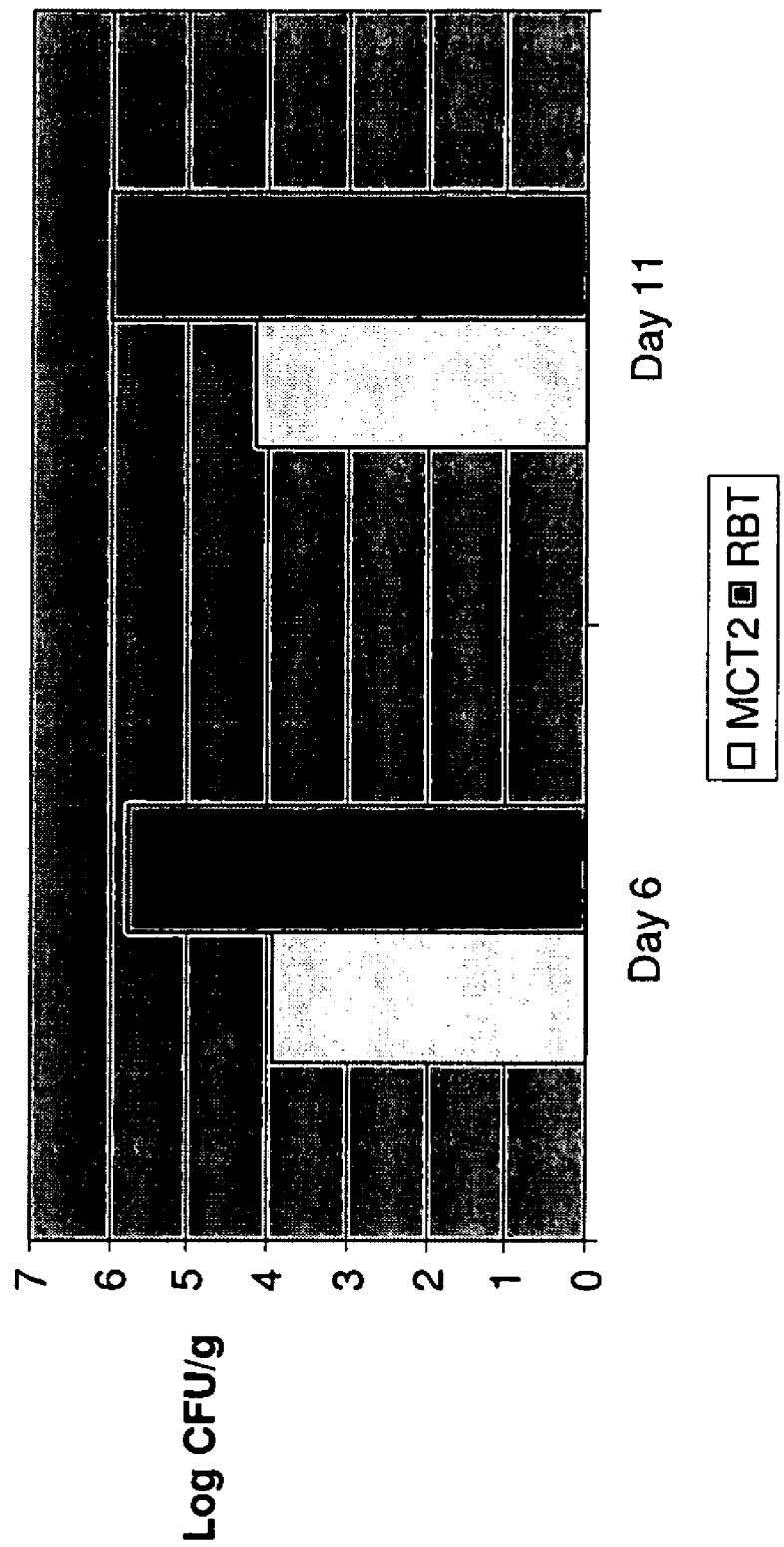
FIG. 26 shows the levels of *E. coli* O157:H7 (Log CFU/g) in MCT-2 and drip from ribbed bottom tray after 6 and 11 days of tomato storage.
Figure 27:
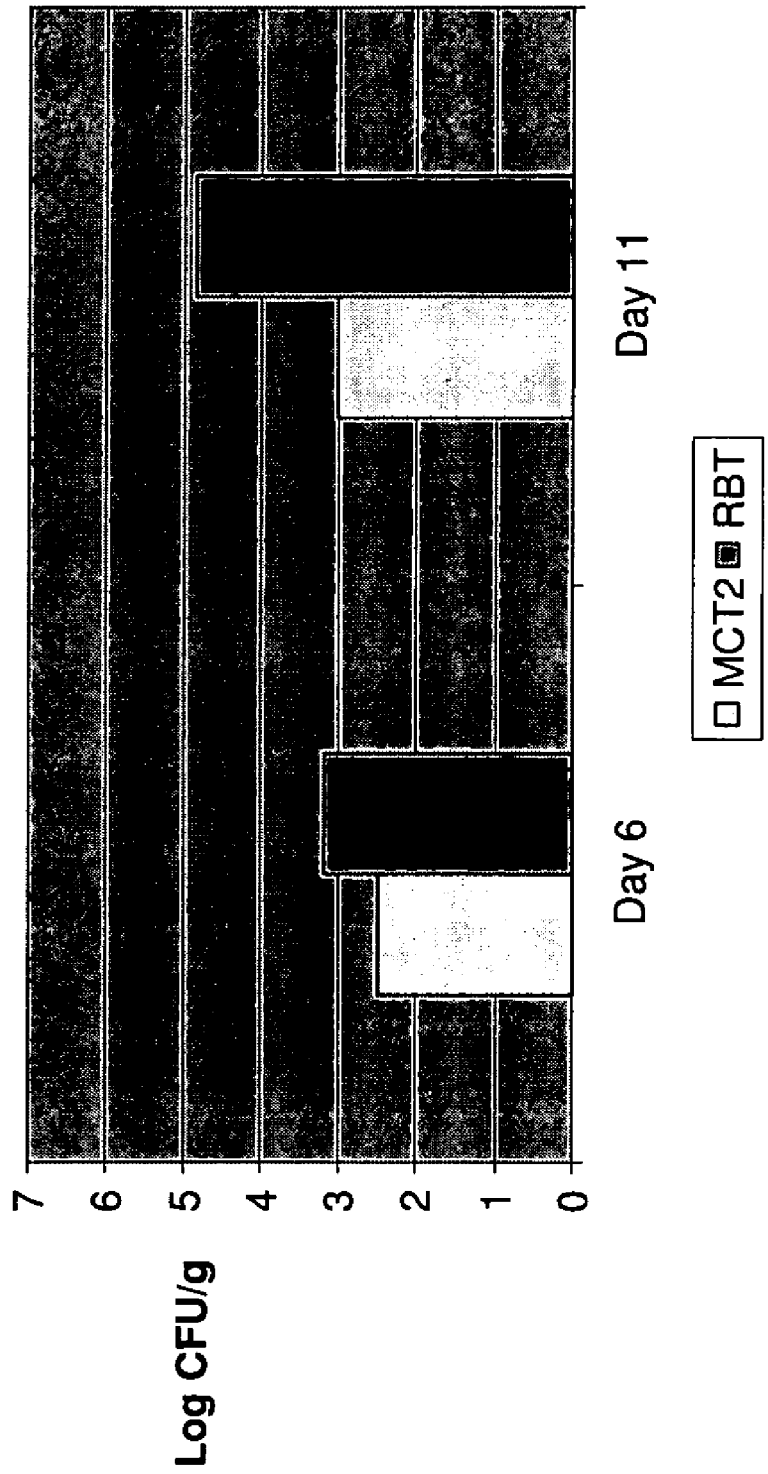
FIG. 27 shows the levels of *Listeria monocytogenes* (Log CFU/g) in MCT-2 and drip from ribbed bottom tray after 6 and 11 days of tomato storage.

Pathogens inoculated onto the tomato slices move to the bottom of the tray as juice drips from the slices. Data in FIGS. 25-27 show that all pathogen levels were substantially lower in drip that is bound by the MCT-2 absorbent and potassium sorbate than in drip collected from the bottom of ribbed bottom trays.

The greatest difference is exhibited by *Salmonella*, which was 4 log units lower (10.000-fold) and 2-log units lower (100-fold) in MCT-2 absorbent and potassium sorbate after 6 and 11 days, respectively, when compared to levels in the ribbed bottom drip.

Levels of *E. coli* O157:H7 were 1.8 log units lower (approximately 100-fold) in the MCT-2 absorbent and potassium sorbate as compared to the ribbed bottom drip.

The effect of MCT-2 absorbent and potassium sorbate on levels of *L. monocytogenes* was most apparent after 11 days of storage when the levels of this pathogen were 1.8 log units lower (100-fold) when compared to levels in drip from ribbed bottom trays. The above data indicate the ability of MCT-2 absorbent and potassium sorbate to inhibit growth of these pathogens during cold storage.

Summary

Use of MCT-2 (absorbent and potassium sorbate) technology had a significant impact on the numbers of this pathogen on sliced tomatoes during storage. *E. coli* O157:H7 is less often associated with tomato outbreaks. MCT-2 (absorbent and potassium sorbate) technology also reduced levels of this pathogen in the sliced tomatoes. Sliced tomatoes exude juice during storage. Tomatoes in ribbed bottom trays remain in contact with their juices, and, if pathogens are present, these juices may spread to product within a tray.

Throughout this application, various publications are referenced. The disclosures of these publications in their entireties are hereby incorporated by reference into this application in order to more fully describe the compounds, compositions and methods described herein.

Various modifications and variations can be made to the compounds, compositions and methods described herein. Other aspects of the compounds, compositions and methods described herein will be apparent from consideration of the specification and practice of the compounds, compositions and methods disclosed herein. It is intended that the specification and examples be considered as exemplary.

What is claimed:

1. A food preservation composition comprising an admixture of:
   (a) an absorbent material composition comprising (i) at least one water-absorbing polymer, wherein the polymer is not crosslinked; (ii) at least one mineral composition; and (iii) at least one water-soluble salt; and
   (b) at least one volatile antimicrobial agent, wherein the at least one volatile antimicrobial agent is coated with one or more water-soluble materials, and the at least one volatile antimicrobial agent is not cinnamaldehyde, mint oil, lavender oil, lemon oil, vanillin, eucalyptus oil, peppermint oil, thymol, eugenol, or α-terpinol,
   wherein the composition is a dry powder and not an agglomerate produced with water or a binder.

2. The composition of claim 1, wherein the polymer comprises a gel-forming water soluble polymer, and the non-crosslinked gel-forming water soluble polymer comprises carboxymethylcellulose and or a salt thereof, hydroxyethylcellulose, methylcellulose, hydroxypropylmethylcellulose, gelatinized starches, gelatin, dextrose, gums, or any combination thereof.

3. The composition of claim 1, wherein the amount of polymer is from about 50 to 92% by weight of the food preservation composition.

4. The composition of claim 1, wherein the mineral composition comprises a clay.

5. The composition of claim 4, wherein the clay comprises attapulgite, montmorillonite, bentonite, hectorite, sericite, kaolin, or any combination thereof.

6. The composition of claim 1, wherein the mineral composition is from about 3 to 30% by weight of the food preservation composition.

7. The composition of claim 1, wherein the soluble salt comprises aluminum sulfate, potassium aluminum sulfate, calcium sulfate, potassium chloride, sodium chloride, or a combination thereof.

8. The composition of claim 1, wherein the soluble salt is from about 1 to 20% by weight of the food preservation composition.

9. The composition of claim 1, wherein the volatile antimicrobial agent comprises origanum, basil, chlorine dioxide, cilantro oil, clove oil, horseradish oil, rosemary, sage, thyme, wasabi or an extract thereof, a bamboo extract, an extract from grapefruit seed, an extract of Rheum palmatum, an extract of coptis chinesis, *cananga odorata, cupressus sempervirens, curcuma longa, cymbopogon citratus, eucalyptus globulus, pinus radiate, piper crassinervium, psidium guayava, rosmarinus officinalis, zingiber officinale*, allyl isothiocyanate (AIT), hinokitiol, carvacrol, sesame oil or any combination thereof.

10. The composition of claim 1, wherein the volatile antimicrobial agent is from 0.25 to 15% by weight of the food preservation composition.

11. The composition of claim 1, wherein the food preservation composition further comprises a non-volatile antimicrobial agent.

12. The composition of claim 11, wherein the non-volatile antimicrobial agent comprises a ascorbic acid, a sorbate salt, sorbic acid, citric acid, a citrate salt, lactic acid, a lactate salt, benzoic acid, a benzoate salt, a bicarbonate salt, a chelating compound, an alum salt, nisin, or any combination thereof.

13. The composition of claim 11, wherein the non-volatile antimicrobial agent is up to 10% by weight of the food preservation composition.

14. The composition of claim 1, wherein the polymer comprises the sodium salt of carboxymethylcellulose, the mineral composition comprises bentonite, and the soluble salt comprises potassium aluminum sulfate.

15. The composition of claim 1, wherein the composition consists essentially of an absorbent material composition comprising (i) at least one water-absorbing polymer, wherein the polymer is not crosslinked; (ii) at least one mineral composition; (iii) at least one water-soluble salt; and (iv) at least one volatile antimicrobial agent, wherein the composition is a dry powder and not an agglomerate produced with water or a binder.

16. A storage container for containing a food, wherein the food preservation composition of claim 1 is held within the container.

17. A method for preserving a food product comprising placing the food product in the proximity of the food preservation composition of claim 1.

18. The method of claim 17, wherein the food preservation composition contacts an exudate produced by the food product.

19. The method of claim 17, wherein the food preservation composition preserves the surface of the food product.

20. A food preservation composition produced by the process comprising admixing in the absence of water or a binder:
   (a) an absorbent material composition comprising (i) at least one water-absorbing polymer, wherein the polymer is not crosslinked; (ii) at least one mineral composition; and (iii) at least one water-soluble salt; and
   (b) at least one volatile antimicrobial agent, wherein the at least one volatile antimicrobial agent is coated with one or more water-soluble materials, and the at least one volatile antimicrobial agent is not cinnamaldehyde, mint oil, lavender oil, lemon oil, vanillin, eucalyptus oil, peppermint oil, thymol, eugenol, or α-terpinol, wherein the composition is a dry powder and not an agglomerate.

21. The composition of claim 1, wherein the water-soluble material comprises cyclodextrin, maltodextrin, corn syrup solid, gum arabic, starch, or any combination thereof.

22. The storage container of claim 16, wherein the container is a closed system, wherein the food preservation composition is present in the container.

23. The storage container of claim 17, wherein the container has a first compartment and a second compartment, wherein the first compartment and a second compartment are separated by a membrane, wherein the first compartment is below or adjacent to the second compartment and contains the food preservation composition, wherein the second compartment is configured to receive a food article, and the membrane is permeable to an exudate produced by the food article.

24. The composition of claim 1, wherein the volatile antimicrobial agent is allyl isothiocyanate coated with cyclodextrin.

25. A food preservation composition comprising an admixture of:
(a) an absorbent material composition comprising (i) at least one water-absorbing polymer, wherein the polymer is not crosslinked; (ii) at least one mineral composition; and (iii) at least one water-soluble salt; and
(b) at least one volatile antimicrobial agent,
wherein the composition is a dry powder and not an agglomerate produced with water or a binder, and
wherein the polymer comprises the polymerization product of a carboxyl-containing ethylenically unsaturated monomer alone or in combination with one or more other ethylenically unsaturated monomers, and the carboxyl-containing ethylenically unsaturated monomer comprises acrylic acid, methacrylic acid, dimethacrylic acid, ethylacrylic acid, crotonic acid, isocrotonic acid, vinylacetic acid, allylacetic acid, maleic acid, fumaric acid, itaconic acid, methylenemalonic acid, maleic acid, maleic anhydride, itaconic acid, itaconic anhydride, or any combination thereof.

26. A storage container for containing a food, wherein the food preservation composition of claim 25 is held within the container.

27. A method for preserving a food product comprising placing the food product in the proximity of the food preservation composition of claim 25.

* * * * *